US012050453B2

(12) United States Patent
Ohara et al.

(10) Patent No.: US 12,050,453 B2
(45) Date of Patent: Jul. 30, 2024

(54) AUTONOMOUS METAL-PLATE INSPECTION APPARATUS, INSPECTION METHOD, AND METHOD FOR MANUFACTURING METAL PLATE

(71) Applicant: JFE STEEL CORPORATION, Tokyo (JP)

(72) Inventors: Yuji Ohara, Tokyo (JP); Fumihiko Takahama, Tokyo (JP)

(73) Assignee: JFE STEEL CORPORATION, Tokyo (JP)

( * ) Notice: Subject to any disclaimer, the term of this patent is extended or adjusted under 35 U.S.C. 154(b) by 326 days.

(21) Appl. No.: 17/432,612

(22) PCT Filed: Feb. 18, 2020

(86) PCT No.: PCT/JP2020/006362
§ 371 (c)(1),
(2) Date: Aug. 20, 2021

(87) PCT Pub. No.: WO2020/171090
PCT Pub. Date: Aug. 27, 2020

(65) Prior Publication Data
US 2022/0155767 A1 May 19, 2022

(30) Foreign Application Priority Data
Feb. 22, 2019 (JP) ................ 2019-030898

(51) Int. Cl.
G05B 19/418 (2006.01)
G06T 7/00 (2017.01)
(52) U.S. Cl.
CPC ... *G05B 19/41875* (2013.01); *G05B 19/4183* (2013.01); *G06T 7/0004* (2013.01)

(58) Field of Classification Search
None
See application file for complete search history.

(56) References Cited

U.S. PATENT DOCUMENTS

2008/0210009 A1  9/2008 Tanishiki

FOREIGN PATENT DOCUMENTS

CN    101120248 A    2/2008
CN    201724930 U    1/2011
(Continued)

OTHER PUBLICATIONS

Nov. 23, 2022 Search Report issued in European Patent Application No. 20759608.1.

(Continued)

*Primary Examiner* — Sean Shechtman
(74) *Attorney, Agent, or Firm* — Oliff PLC

(57) ABSTRACT

An autonomous metal-plate inspection apparatus, an inspection method, and a method for manufacturing a metal plate by using the inspection apparatus. The autonomous metal-plate inspection apparatus includes a carriage that travels on a surface of a metal plate, a navigational transmitter or a navigational receiver, an inspection device that includes flaw detection head including an inspection sensor, which scans an inspection region of the metal plate, and an inspection-result generation unit for generating an inspection result, and a control unit that performs, on the basis of a position of the carriage measured by the position measurement system and a target position, control the carriage to autonomously travel to the target position and control the flaw detection head to scan. The inspection-result generation unit generates the inspection result on the basis of inspection information obtained by the inspection sensor and position information of the flaw detection head.

13 Claims, 20 Drawing Sheets

(56) References Cited

FOREIGN PATENT DOCUMENTS

| CN | 108956761 A | 12/2018 |
|---|---|---|
| JP | H09-049827 A | 2/1997 |
| JP | 2000-046810 A | 2/2000 |
| JP | 5-172798 B2 | 3/2013 |
| JP | 2014-074700 A | 4/2014 |
| JP | 2014-089173 A | 5/2014 |
| JP | 2015-194491 A | 11/2015 |
| JP | 5954241 B2 | 7/2016 |
| JP | 2018-075707 A | 5/2018 |
| RU | 2 629 687 C1 | 8/2017 |

OTHER PUBLICATIONS

Gao, W. et al., "Measurement technologies for precision positioning", CIRP Annals—Manufacturing Technology, vol. 64, No. 2, pp. 773-796, Jan. 2015.
Dec. 10, 2021 Office Action issued in Russian Patent Application No. 2021124764.
Apr. 14, 2023 Office Action issued in Korean Patent Application No. 10-2021-7025458.
Apr. 7, 2020 International Search Report issued in PCT/JP2020/006362.
Mar. 4, 2024 Office Action issued in EP 20759608.1.
Feb. 29, 2024 Office Action issued in Chinese Application No. 202080015200.8.

ROLLING DIRECTION

ROLLING DIRECTION

ROLLING DIRECTION

ROLLING DIRECTION

ROLLING DIRECTION

AUTONOMOUS METAL-PLATE INSPECTION APPARATUS, INSPECTION METHOD, AND METHOD FOR MANUFACTURING METAL PLATE

TECHNICAL FIELD

This application relates to an autonomous metal-plate inspection apparatus using a position measurement system and an inspection method. In addition, this application relates to a method for manufacturing a metal plate, the method including a step of inspecting a metal plate for defects by using the autonomous metal-plate inspection apparatus.

BACKGROUND

In the related art, a metal plate such as a steel plate is inspected by ultrasonic testing for scratches that are formed on a surface of the metal plate or defects that are present inside the metal plate (hereinafter also simply referred to as "internal defects") in order to ensure the quality of the metal plate.

In recent years, an autonomous inspection apparatus has been developed as an apparatus that inspects a metal plate for scratches formed on a surface of the metal plate or internal defects of the metal plate. One of the simplest autonomous inspection apparatuses is an apparatus that can move on a metal plate and that is equipped with a flaw detection head. In the case of using such an inspection apparatus, it is necessary to attach a rib plate or the like around a plate to be inspected in order to scan the entire surface of the plate to be inspected.

In the autonomous inspection apparatus disclosed in Patent Literature 1, as illustrated in FIG. 22, a crawler carriage 8 travels by using caterpillar treads 8a, and when moving side to side, the crawler carriage 8 travels by using laterally movable wheels 8b. Sensors 2b that detect end edges of a metal plate are provided in front of and to the rear of the crawler carriage 8, and probes 2a that inspect a metal plate for scratches formed on the metal plate are arranged on guide rails. The crawler carriage 8 is structured in such a manner that a search position can be calculated by a measure A that is provided at an end edge of a metal plate 1 and a stretchable measure B that is provided at a reference point P on the metal plate 1.

As an example of a method for measuring the position of an autonomous inspection apparatus, a method of installing a guide wire on a travel path is known. As another example of the method, there is known a method of recording a video of the floor surface or the ceiling surface of a travel path by a camera and performing image processing on the video. As another example of the method, there is known a method of mounting a gyro sensor onto an autonomous inspection apparatus and calculating the current position by adding up a travelling speed and an angular velocity at high speed.

The flaw detector disclosed in Patent Literature 2 is an autonomous metal-plate inspection apparatus that inspects a metal plate by using a position measurement system that performs self-position measurement in an indoor space on the basis of the principle of triangulation. In the embodiments, the case of using a normal beam technique is introduced as an example of the ultrasonic testing of steel plates for pressure vessels defined by JIS G 0801. A normal beam technique is one of the pulse reflection methods. Each flaw detection head has one ultrasonic-wave generation source (transducer), and inspection data is reflection echo (A-scope), which is primary information. Among the information items included in an A-scope, information regarding "the magnitude of a defect" is extracted from a peak height of a defect echo, and information regarding "the position of the defect in a depth direction" is extracted from an ultrasonic-wave propagation time. Inspection data is transmitted from an on-board computer to a host computer together with information regarding an inspection position that is calculated in real time. Then, the positions of defects inside a metal plate are mapped on a plane of the metal plate and displayed so as to visualize the two-dimensional positions of the defects.

JIS G 0801 defines an automatic or manual ultrasonic testing for a carbon steel or alloy steel plate that is used for a nuclear reactor, a boiler, a pressure vessel or the like having a thickness of 6 mm or more and 300 mm or less.

In an ultrasonic testing for a steel plate having a thickness of more than 60 mm, a normal probe is designated as the type of a probe to be used. In general, as a plate thickness increases, a signal to noise (S/N) ratio becomes smaller due to scattering and attenuation of ultrasonic waves in a propagation path.

The development of an ultrasonic phased array technology has been advanced since the 1980s, and during the early years of the 21st century, it has reached a mature stage as a new technical field. In the phased array technology, a flaw detection head uses a plurality of ultrasonic-wave generation sources (transducers), and a direction of a beam and a focal point can be freely changed by electrically controlling a transmission timing. In other words, the S/N ratio is improved by controlling the focal point in a plate-thickness direction, and this enables detection of minute defects present in a steel plate having a thickness of more than 300 mm, which has been difficult to perform in the related art.

CITATION LIST

Patent Literature

PTL 1: Japanese Unexamined Patent Application Publication No. 5-172798

PTL 2: Japanese Patent No. 5954241

SUMMARY

Technical Problem

In Patent Literatures 1 and 2, when the inspection unit employs the phased array technique, the amount of information of flaw detection data becomes enormous. In such a case, there is a problem in that the enormous amount of information of flaw detection data hinders transmission of data to a host computer.

In addition, when the inspection unit employs the phased array technique, the primary information of inspection data is reflected echo, and thus, calculation of paths of the beams emitted from a plurality of transducers, interpretation of flaw detection results with consideration of these paths, and so forth become complex. Consequently, it is technically difficult to make inspection data independent of a flaw detector and to cause the host computer to have a function of drawing flaw detection results. For this reason, it is common to use a dedicated device as an inspection sensor, and flaw detection results are typically drawn by using a function of the dedicated device.

The disclosed embodiments have been made in view of the above situation, and it is an object of the disclosed embodiments to provide an autonomous metal-plate inspection apparatus capable of efficiently generating inspection results even when flaw detection data has an enormous amount of information, an inspection method, and a method for manufacturing a metal plate by using the inspection apparatus.

Solution to Problem

The inventors conducted extensive studies in order to solve the above problem. In the process of the studies, the inventors configured an autonomous metal-plate inspection apparatus that includes a predetermined inspection unit, a predetermined control unit, and so forth and that generates inspection results on the basis of inspection information obtained by an inspection sensor and information regarding the position of a flaw detection head. The inventors discovered that, even when flaw detection data has an enormous amount of information, inspection results can be efficiently generated by the autonomous metal-plate inspection apparatus having the above configuration, and accordingly, the disclosed embodiments have been made. The above problem is solved by the following means.

[1] An autonomous metal-plate inspection apparatus for inspecting a metal plate by using a position measurement system that measures a position based on the principle of triangulation which includes a carriage that travels on a surface of a metal plate, a navigational transmitter mounted on the carriage for transmitting position-measurement-system signals or a navigational receiver mounted on the carriage for receiving position-measurement-system signals, an inspection unit mounted on the carriage that includes a flaw detection head and an inspection-result generation unit for generating an inspection result. The flaw detection head includes an inspection sensor for scanning an inspection region of the metal plate. The inspection unit further includes a control unit that performs, based on a position of the carriage measured by the position measurement system and a target position of the carriage for performing inspection, control of the carriage to autonomously travel to the target position and control of a scanning actuator that scans the flaw detection head. The inspection-result generation unit generates the inspection result based on inspection information obtained by the inspection sensor and position information of the flaw detection head.

[2] In the autonomous metal-plate inspection apparatus described in [1], the control unit performs, based on the position and an attitude of the carriage that are measured by the position measurement system and the target position and attitude of the carriage for performing inspection, control of the carriage to autonomously travel to the target position and attitude.

[3] In the autonomous metal-plate inspection apparatus described in [1] or [2], the inspection sensor is a phased array probe in which a plurality of ultrasonic transducers are arranged.

[4] The autonomous metal-plate inspection apparatus described in [3] further includes an output unit for outputting a pulse signal corresponding to an amount of change in a position of the flaw detection head, which is updated in each control period, to the inspection sensor, wherein the pulse signal is used as the positional information of the flaw detection head.

[5] In the autonomous metal-plate inspection apparatus described in [4], an output frequency of the pulse signal generated by the output unit is set to synchronize with a product of an acquiring frequency of flaw detection data set by the inspection unit, a pulse resolution, and a display resolution of the inspection result, and a mechanical scanning speed of the flaw detection head is equal to or lower than an upper speed limit that is calculated by multiplying the display resolution of the inspection result and the acquiring frequency of flaw detection data.

[6] In the autonomous metal-plate inspection apparatus described in any one of [1] to [5], the position measurement system is an indoor global position system (IGPS), and the navigational receiver receives rotating fan beams emitted from one or more navigational transmitters of the IGPS and recognizes the rotating fan beams to be IGPS signals that are the position-measurement-system signals.

[7] In the autonomous metal-plate inspection apparatus described in any one of [1] to [5], the position measurement system employs a laser triangulation technology. The navigational transmitter is configured to have a function of projecting and receiving laser beams and uses laser triangulation, and the navigational transmitter causes laser beams projected by the navigational transmitter to be reflected by one or more reflectors and receives reflected light as the position-measurement-system signals.

[8] In the autonomous metal-plate inspection apparatus described in any one of [1] to [7], the carriage includes at least two rotatable wheels and driving units that drive the wheels, and each of the driving units is provided for a corresponding one of the wheels and includes a first driving system that drives the corresponding wheel to rotate and a second driving system that is capable of driving the wheel to turn 90 degrees or more about an axis that is perpendicular to a surface of a metal plate on which the carriage travels and that offset toward the center of the carriage with respect to the wheel.

[9] The autonomous metal-plate inspection apparatus described in any one of [1] to [8] further includes an edge detection sensor that is included in the carriage and that detects an edge of a metal plate, which is an inspection target.

[10] An autonomous metal-plate inspection method for inspecting a metal plate by using a position measurement system for measuring a position on a basis of the principle of triangulation. The method uses an autonomous metal-plate inspection apparatus including a carriage that travels on a surface of a metal plate, a navigational transmitter mounted on the carriage for transmitting position-measurement-system signals or a navigational receiver mounted on the carriage for receiving position-measurement-system signals, an inspection unit mounted on the carriage that includes a flaw detection head and an inspection-result generation unit for generating an inspection result, the flaw detection head including an inspection sensor for scanning an inspection region of the metal plate, and a control unit that performs, based on a position of the carriage measured by the position measurement system and a target position of the carriage for performing inspection, control of the carriage to autonomously travel to the target position and control of a scanning actuator to scan the flaw detection head. The inspection-result generation unit generates the inspection result based on inspection information obtained by the inspection sensor and position information of the flaw detection head.

[11] In the autonomous metal-plate inspection method described in [10], the control unit performs, based on a position and an attitude of the carriage that are measured by the position measurement system and a target position and attitude of the carriage for performing inspection, control of the carriage to autonomously travel to the target position and attitude.

[12] A method for manufacturing a metal plate includes a manufacturing step of manufacturing metal plates, an inspection step of inspecting the metal plates for defects that are present in the metal plates by using the autonomous metal-plate inspection apparatus described in any one of [1] to [9], and a screening step of screening the metal plates based on inspection results obtained in the inspection step.

Advantageous Effects

According to embodiments, an autonomous metal-plate inspection apparatus capable of efficiently generating inspection results even when flaw detection data has an enormous amount of information, an inspection method, and a method for manufacturing a metal plate by using the inspection apparatus can be provided. In addition, the autonomous metal-plate inspection apparatus of the disclosed embodiments can be suitably used particularly when an inspection unit employs an ultrasonic phased array technology.

DETAILED DESCRIPTION

Figure 1:
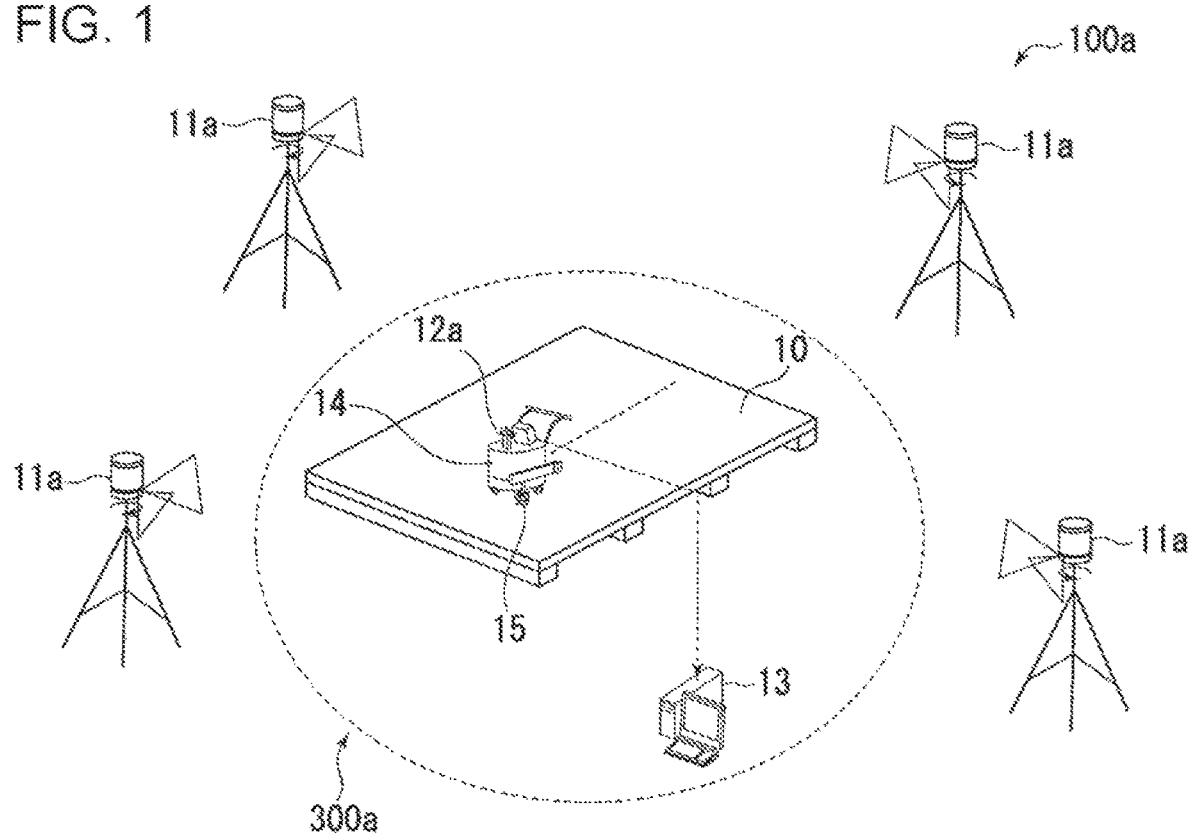
FIG. 1 is a perspective view illustrating a schematic configuration of an overall system according to a first embodiment.

Embodiments will be described below with reference to the accompanying drawings. However, the scope of this disclosure is not intended to be limited to the specific examples illustrated in the drawings.

The autonomous metal-plate inspection apparatus of the disclosed embodiments is an autonomous metal-plate inspection apparatus that inspects a metal plate by using a position measurement system for measuring a position based on the principle of triangulation. The autonomous metal-plate inspection apparatus includes a carriage that travels on a surface of a metal plate, a navigational transmitter mounted on the carriage for transmitting position-measurement-system signals or a navigational receiver mounted on the carriage for receiving position-measurement-system signals. The autonomous metal-plate inspection apparatus further includes an inspection unit mounted on the carriage that includes a flaw detection head and an inspection-result generation unit for generating an inspection result. The flaw detection head includes an inspection sensor for scanning an inspection region of the metal plate. The autonomous metal-plate inspection apparatus also includes a control unit that performs, based on a position of the carriage measured by the position measurement system and a target position of the carriage for performing an inspection, control of the carriage to autonomously travel to the target position and control of a scanning actuator to scan the flaw detection head. The inspection-result generation unit generates the inspection result based on inspection information obtained by the inspection sensor and position information of the flaw detection head. Embodiments will be described below.

Note that, in the disclosed embodiments, the position of a carriage for performing inspection will also be simply referred to as a target position. In addition, in the disclosed embodiments, the term "defect" refers to an internal defect such as a foreign matter, a crack, or a hole inside a metal plate. Furthermore, in the disclosed embodiments, the wording "the attitude of a carriage" refers to the inclination of the carriage in a three-dimensional space with respect to the orientation of the carriage when performing inspection as a reference. Although the following description is based on the assumption that a steel plate is used as an example of a metal plate, the autonomous metal-plate inspection apparatus of the disclosed embodiments is also applicable to inspections of various metal plates such as an aluminum plate and a copper plate.

Figure 2:
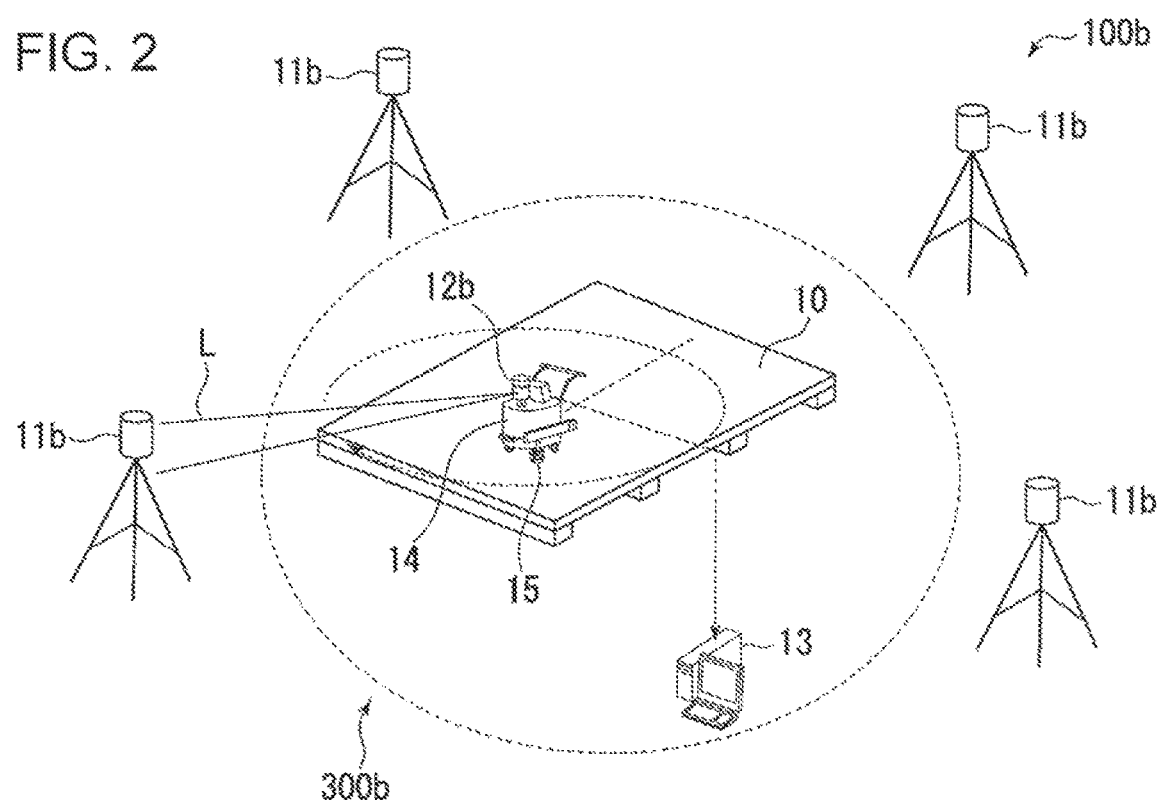
FIG. 2 is a perspective view illustrating a schematic configuration of an overall system according to a second embodiment.
Figure 3A:
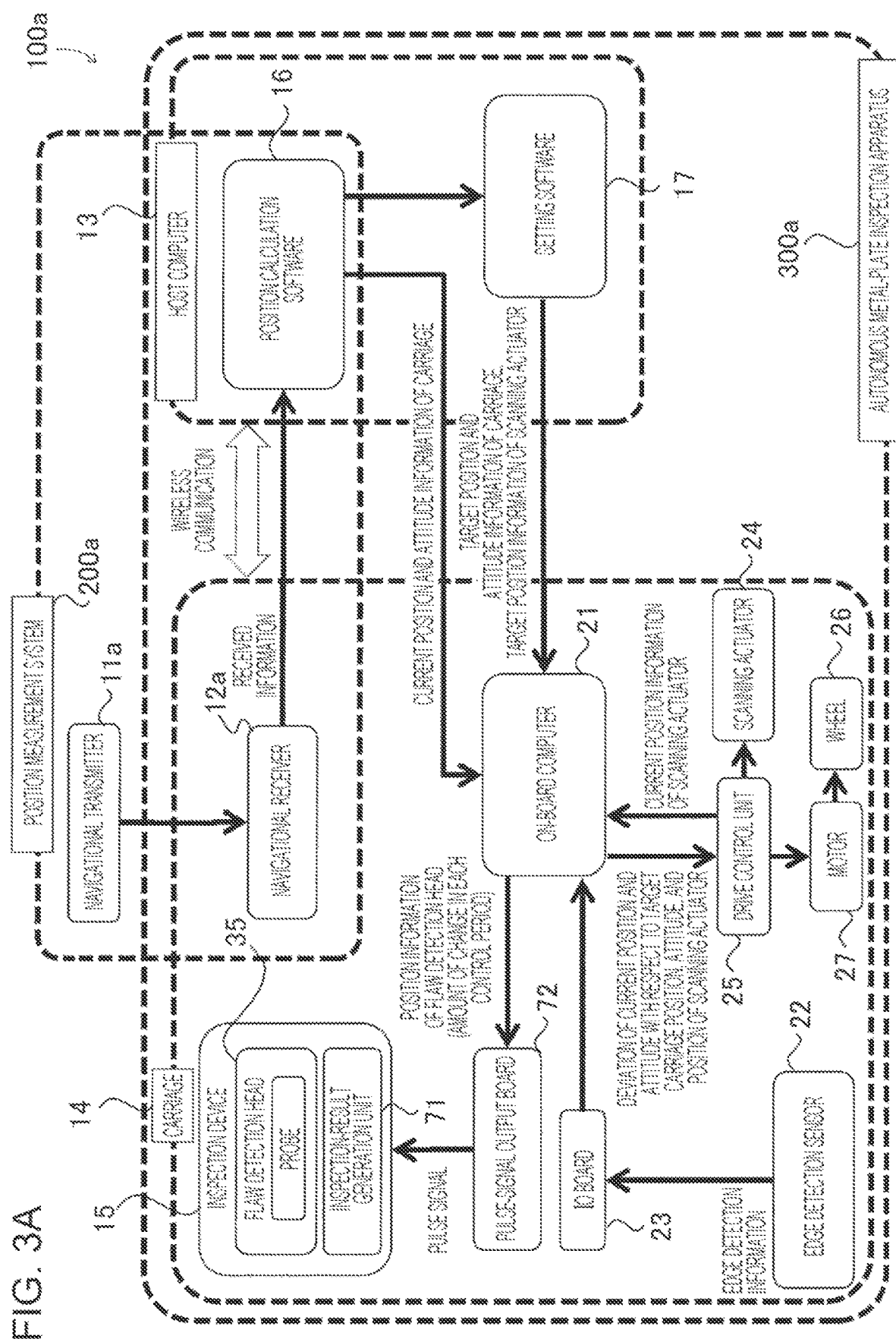
FIG. 3A is a block diagram of the overall system according to the first embodiment.
Figure 3B:
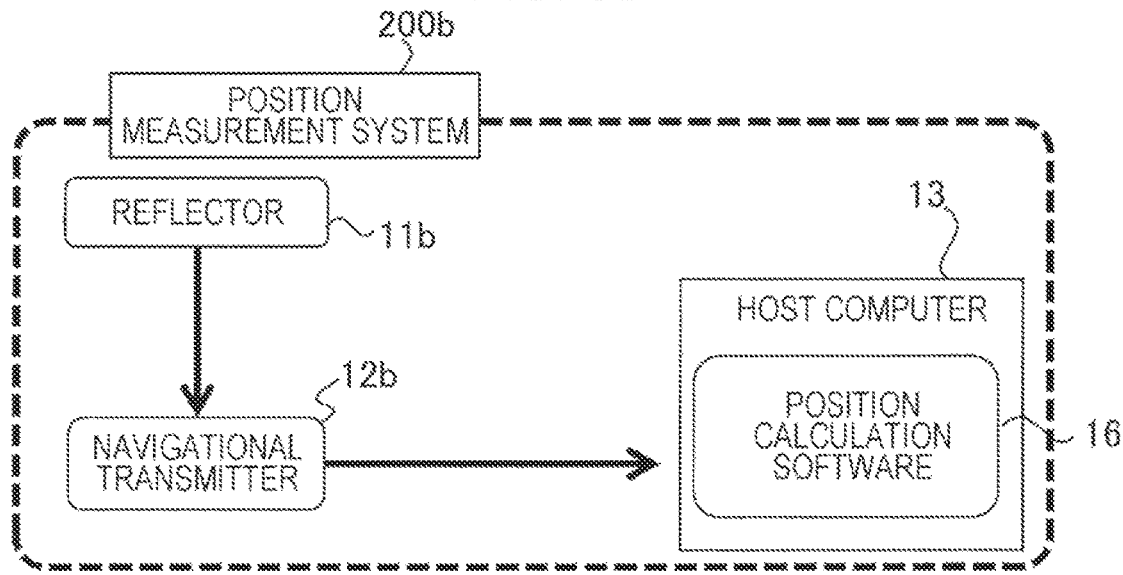
FIG. 3B is a block diagram of a position measurement system according to the second embodiment.

FIG. 1 is a perspective view illustrating a schematic configuration of an overall system 100a according to the first embodiment. FIG. 2 is a perspective view illustrating a schematic configuration of an overall system 100b according to the second embodiment. FIG. 3A is a block diagram illustrating the overall system 100a according to the first embodiment. FIG. 3B is a block diagram of a position measurement system 200b according to the second embodiment.

The overall system 100a according to the first embodiment includes a position measurement system 200a and an autonomous metal-plate inspection apparatus 300a.

The position measurement system 200a includes a plurality of navigational transmitters 11a, a navigational receiver 12a, and a host computer 13 including position calculation software 16. The position measurement system 200a performs self-position measurement in an indoor space on the basis of the principle of triangulation. For example, the position measurement system 200a can use an indoor global position system (IGPS).

In general, a global position system (GPS) is a system that determines and sets three-dimensional coordinate values (hereinafter referred to as "coordinate values") that match the position of a GPS receiver by using three or more GPS artificial satellites. The IGPS is a position measurement system that applies such a concept to an indoor space. For example, the IGPS is described in detail in U.S. Pat. No. 6,501,543.

The autonomous metal-plate inspection apparatus 300a according to the first embodiment includes, for example, a carriage 14 that travels on a metal plate 10, the navigational receiver 12a mounted on the carriage 14, an inspection device (inspection unit) 15 that includes a flaw detection head 35 having a probe (an inspection sensor) mounted on the carriage 14. The autonomous metal-plate inspection apparatus 300a also includes a host computer 13 that includes software for causing the carriage 14 to autonomously travel to a predetermined target position.

In the position measurement system 200a, each of the navigational transmitters 11a emits two rotating fan beams (fan beams). The rotating fan beams may be laser fan beams or other light emitting means may be used. The navigational receiver 12a is capable of determining its position relative to a plurality of transmitters by receiving the rotating fan beams emitted from the transmitters. In this case, the rotating fan beams deviate from one another by a predetermined angle, and the coordinate values of the receiver receiving the rotating fan beams, that is, the position or the height of the receiver can be measured. Information that is received by the navigational receiver 12a is wirelessly transmitted to the host computer 13, and the host computer 13 calculates the position of the navigational receiver 12a in accordance with the principle of triangulation. Thus, by calculating the position of the navigational receiver 12a by such a method, information regarding the current position and attitude of the carriage 14 that includes the navigational receiver 12a can be obtained in real time during travelling of the carriage.

FIG. 2 illustrates a schematic configuration of the overall system 100b according to the second embodiment. The overall system 100b includes the position measurement system 200b and an autonomous metal-plate inspection apparatus 300b. The autonomous metal-plate inspection apparatus 300b of the second embodiment includes a navigational transmitter 12b that transmits a position-measurement-system signal, whereas the autonomous metal-plate inspection apparatus 300a of the first embodiment includes the navigational receiver 12a that receives a position-measurement-system signal.

As illustrated in FIG. 3B, the position measurement system 200b according to the second embodiment includes the navigational transmitter 12b mounted on an upper portion of the carriage 14, a plurality of reflectors 11b, and the host computer 13 including the position calculation software 16. The position measurement system 200b according to the second embodiment performs self-position measurement in an indoor space on the basis of the principle of triangulation. The position measurement system 200b according to the second embodiment can use a laser triangulation technology that is employed by, for example, a cleaning robot that autonomously travels in an office building or the like (see, for example, http://robonable.typepad.jp/news/2009/11/25subaru.html).

The autonomous metal-plate inspection apparatus 300b includes, for example, the carriage 14 that travels on the metal plate 10, the navigational transmitter 12b that is disposed on an upper portion of the carriage 14, the inspection device 15 that includes a flaw detection head 35 having a probe, which is an inspection sensor. The autonomous metal-plate inspection apparatus 300b also includes the host computer 13 that includes the software for causing the carriage 14 to autonomously travel to a predetermined target position.

In the second embodiment, the navigational transmitter 12b employs the laser triangulation technology. The autonomous travel of the carriage 14 uses the navigational transmitter 12b, which performs laser triangulation, and the reflectors 11b each of which is disposed on, for example a wall surface. The navigational transmitter 12b is disposed on, for example, the upper portion of the carriage 14 and has a function of projecting and receiving laser beams. The navigational transmitter 12b projects a laser beam L in 360 degrees and receives light reflected by the reflectors 11b as position-measurement-system signals. A distance is determined from the time taken for the reflected light to reach the navigational transmitter 12b, and a direction in which each of the reflectors 11b is located is determined from the angle of the corresponding reflected light. By comparing the determined distances and directions with the coordinate positions of the reflectors 11b that are registered beforehand, the position of the navigational transmitter 12b and the direction in which the navigational transmitter 12b is located can be calculated. Thus, by calculating the position of the navigational transmitter 12b by such a method, information regarding the current position and attitude of the carriage 14 that includes the navigational transmitter 12b can be obtained in real time during travelling of the carriage 14.

In the configuration, which will be described below, the autonomous metal-plate inspection apparatus 300a according to the first embodiment is used, and the case in which the position measurement system 200a is used will be described as an example. The configuration which will be described below is also applicable to the autonomous metal-plate inspection apparatus 300b according to the second embodiment. In addition, the configuration will be described below taking, as an example, the case in which the position information and the attitude information of the carriage are used. Note that, in the case where a metal plate to be inspected is placed so as to be parallel to a flat surface that is not inclined with respect to the horizontal ground and where the attitude of the carriage is kept constant, the attitude information is not necessary.

As illustrated in FIG. 3A, the host computer 13 includes, for example, position calculation software 16 that calculates the position of the above-mentioned navigational receiver 12a and setting software 17 that sets the target position of the carriage 14 and the attitude information of the carriage 14 when performing inspection.

As illustrated in FIG. 3A, the carriage 14 includes, for example, the navigational receiver 12a, which is a portion of the above-mentioned position measurement system 200a, the inspection device 15 that includes a flaw detection head 35 and an inspection-result generation unit 71. The carriage 14 further includes an on-board computer 21, edge detection sensors 22 that detect edges of the metal plate 10, an IO board 23, and a scanning actuator 24 for scanning the flaw detection head 35. The carriage 14 further includes a drive control unit 25 that includes a controller and a driver, wheels 26 for travelling, and wheel motors 27 for driving and turning the wheels. Here, the position calculation software 16 and the setting software 17, which are included in the host computer 13, may also be installed in the on-board computer 21.

The on-board computer 21 includes a control unit that performs control of the carriage 14 to autonomously travel to the target position and attitude and control of the scanning actuator 24 that scans the flaw detection head 35, on the basis of the position and the attitude of the carriage 14 that are measured by the position measurement system 200a and the target position and attitude of the carriage 14 for performing inspection. The flaw detection head 35 is scanned at the target position of the carriage 14. In the autonomous travel, for example, first, the current position and attitude of the carriage 14, which are calculation results obtained by the above-mentioned host computer 13, the target position and attitude of the carriage 14 for performing inspection, and information regarding the target position of the scanning actuator 24 are wirelessly transmitted to the on-board computer 21 included in the carriage 14. Next, the on-board computer 21 calculates deviation of the current position and attitude with respect to the target position and attitude. Then, a control signal is output by the drive control unit 25 to the wheel motors 27 in such a manner that the deviations that depends on the position and the attitude of a carriage main body becomes zero, and feedback control of the speed and the steering angle of each of the wheels 26 is performed, so that the carriage 14 autonomously travels to the target position and attitude. Note that, in the case where the above-mentioned attitude information is not necessary, the on-board computer 21 may include a control unit that performs control of the carriage 14 to autonomously travel to the target position and control of the scanning actuator 24 that scans the flaw detection head 35, on the basis of the position of the carriage 14 measured by the position measurement system 200a and the target position of the carriage 14 for performing inspection.

Control of a scanning operation of the inspection sensor (probe) performed by the on-board computer 21 will now be described. In the case of drawing a two-dimensional defect image in the X direction and the Y direction, when, for example, a pulse reflection technique is used as a scanning method, the scanning operation of the probe is controlled by performing a mechanical rectangular scan of the flaw detection head 35 in the X and Y directions. In addition, when, for example, the phased array technique is used as a scanning method, electronic beam scanning in the X direction and mechanical scanning of the flaw detection head 35 in the Y direction are controlled. Control of the mechanical scanning of the flaw detection head 35 is performed by the scanning actuator 24. The phased-array flaw detection head 35 includes a plurality of ultrasonic-wave generation sources (transducers), and the distance at which electronic beam scanning can be performed depends on the width, the arrangement pitch, and the number of transducers. The internal structure of the flaw detection head 35 requires a high manufacturing accuracy, and thus, the flaw detection head 35 is usually more expensive than a flaw detection head of a normal probe of the related art. Considering the maintainability such as replacement in the case where the flaw detection head 35 breaks, the number of transducers is usually about 10 to 128. For example, when the beam scanning distance in the X direction is 120 mm and the dimension of a metal plate in the X direction is 5,000 mm, in order to perform flaw detection on the entire surface of the metal plate, the shortage in the beam scanning is compensated by travelling of the wheels of the carriage 14 at a pitch of 100 mm. In addition, for example, when the dimension in the Y direction is 2,000 mm and the stroke of the scanning actuator 24, which scans the flaw detection head 35 in the Y direction, is 600 mm, the shortage in the mechanical scanning of the scanning actuator 24 is compensated by travelling of the wheels of the carriage 14 at a pitch of 500 mm.

A function of the autonomous metal-plate inspection apparatus 300a for inspecting the metal plate 10 will now be described. This function is implemented by, for example, the inspection device 15, which includes the flaw detection head 35 having the probe (inspection sensor) that inspects an inspection region of the metal plate 10, the scanning actuator 24, which controls the scanning of the flaw detection head 35, the on-board computer 21, and the drive control unit 25. The on-board computer 21 calculates, by using information items regarding the inspection position and the current position and attitude of the carriage received from the host computer 13, a required scanning amount of the scanning actuator 24 to scan the flaw detection head 35, which is a component of the inspection device 15. The drive control unit 25 outputs an electrical signal to the scanning actuator 24 to drive the scanning actuator 24 with the required scanning amount, and the scanning actuator 24 converts the electrical signal into the scanning motion of the flaw detection head 35. The position information of the flaw detection head 35 is fed back to the on-board computer 21 and calculated as inspection position information together with the information regarding the current position of the carriage 14. The inspection data in the inspection device 15 is loaded into the on-board computer 21 from the inspection device 15 via the IO board 23 and wirelessly transmitted to the host computer 13 together with the inspection position information. In this instance, the scanning actuator 24 may control the position of the flaw detection head 35 in conjunction with the control of the carriage 14 to autonomously travel or may control the position of the flaw detection head 35 independently of the autonomous travel of the carriage 14.

The inspection device 15 includes the flaw detection head 35 and the inspection-result generation unit 71 that generates inspection results. The inspection-result generation unit 71 generates inspection results on the basis of inspection information obtained by the probe (inspection sensor) and the position information of the flaw detection head 35. For example, the inspection-result generation unit 71 generates, as an inspection result, a flaw detection map in which the position information of a metal plate and information regarding the flaw detection result are associated with each other. With the apparatus configuration of the disclosed embodiments, inspection results may be generated by the inspection device 15, and the host computer 13 does not need to generate a flaw detection map.

Even in the case where inspection sensor (probe) employs an ultrasonic phased array technology, it is not necessary to transmit an enormous amount of flaw detection data to the host computer 13, and even when flaw detection data has an enormous amount of information, inspection results can be efficiently generated and evaluated.

In the case of employing an ultrasonic phased array technology, a commonly known technology can be used. This matter will be briefly described below. In the case of employing an ultrasonic phased array technology, the inspection sensors included in the flaw detection head 35 is a phased array probe in which a plurality of ultrasonic transducers are arranged. In the ultrasonic phased array technique, by electronically controlling the timing (delay time) at which each ultrasonic transducer emits ultrasonic wave, the ultrasonic beam can be focused at an arbitrary position, or the ultrasonic wave can be caused to propagate in an arbitrary direction.

In addition, in the case of drawing a two-dimensional defect image in the X direction and the Y direction by using an ultrasonic phased array technology, since electronic scanning of beam is performed in the X direction, a defect image can be drawn within the range of the number of channels only by mechanical scanning of the flaw detection head 35 in the Y direction. As a beam scanning method, a commonly known scanning method such as linear scanning, sector scanning, or dynamic depth focusing (DDF) can be used.

As the position information of the flaw detection head 35, pulse signals can be used. In this case, for example, a pulse-signal output board 72 that serves as an output unit for outputting pulse signals corresponding to the amount of change in the position of the flaw detection head 35, which are updated in each control period of the on-board computer 21, to the probe (inspection sensors) is installed in the on-board computer 21. As the above-mentioned pulse signals, for example, pulse signals (A-scope and B-scope) indicating positions in a horizontal surface of a steel plate in the X-axis direction and the Y-axis direction can be used.

As a result, it is not necessary to retrieve large amounts of flaw detection data from the inspection device 15. In other words, in the phased array technique, calculation of paths of the beams emitted from a plurality of transducers, analysis of flaw detection results with consideration of these paths, and so forth may be performed by the inspection device 15, and it is not necessary to output large amounts of data such as flaw detection data to the host computer 13. Therefore, the inspection method of the disclosed embodiments is a highly practical method.

The on-board computer 21 included in the carriage 14 includes the pulse-signal output board (output unit) 72 that outputs pulse signals corresponding to the amount of change in the positions of the flaw detection head 35, which are updated in each control period, to the inspection device 15. When a flaw detection map is generated, for example, flaw detection positions (the positions of the flaw detection head 35) in real time are calculated on the basis of information regarding the actual position and attitude of the carriage 14 and the stroke position of the scanning actuator 24, and the calculation results are output as pulse signals to the inspection device 15. Note that the above-mentioned information regarding the actual position and attitude of the carriage 14 is acquired in real time by the IGPS. It is preferable that the output frequency of the pulse signals generated by the pulse-signal output board 72 be set so as to synchronize with the setting conditions of the inspection device 15 and the mechanical scanning speed of the flaw detection head 35.

For example, when the display resolution of a flaw detection map (the display resolution of inspection results) is 2 mm and the acquiring frequency of flaw detection data is 50 Hz, the maximum scanning speed at which missing flaw detection data does not occur within the display resolution of 2 mm is the product of these values, which is 100 mm/s. In other words, when the mechanical scanning speed of the flaw detection head 35 exceeds 100 mm/s, omission of the flaw detection data occurs while the flaw detection head 35 travel a distance of 2 mm, which is the display resolution. Thus, in order to improve the accuracy of flaw detection results, it is preferable to adjust the mechanical scanning speed of the flaw detection head 35 in such a manner that the flaw detection data can be reliably acquired while the flaw detection head 35 travels a distance of 2 mm, which is the display resolution.

Figure 4A:
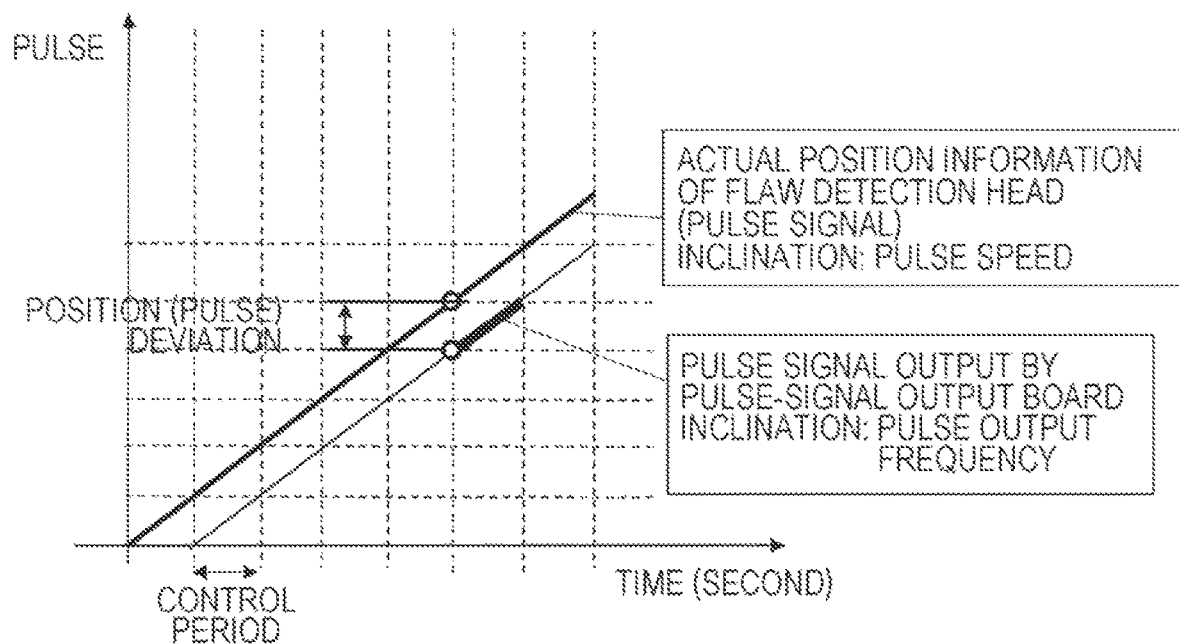
FIG. 4A is a graph illustrating an example of the relationship between pulse and time for describing the amount of change in the position of a flaw detection head that is updated in each control period.

In addition, in the case in which the acquiring frequency of flaw detection data is set to 50 Hz, the pulse resolution of the inspection device 15, which receives pulse signals, is set to 10 pulses/mm, and the display resolution of a flaw detection map, which is the spatial resolution when a flaw detection result is displayed, is set to 1 mm, the pulse frequency to be input to the inspection sensor is determined by the product of these values, which is 500 Hz. When the output frequency of the pulse signals generated by the pulse-signal output board 72 is 500 Hz, which is synchronized with the above, changes in the position of the flaw detection head 35 with time received by the inspection sensor (probe) are continuous and close to the actual movements. The relationship between the actual position information of the flaw detection head (pulse signal) and the pulse signal output by the pulse-signal output board 72 in this case is illustrated in FIG. 4A.

Figure 4B:
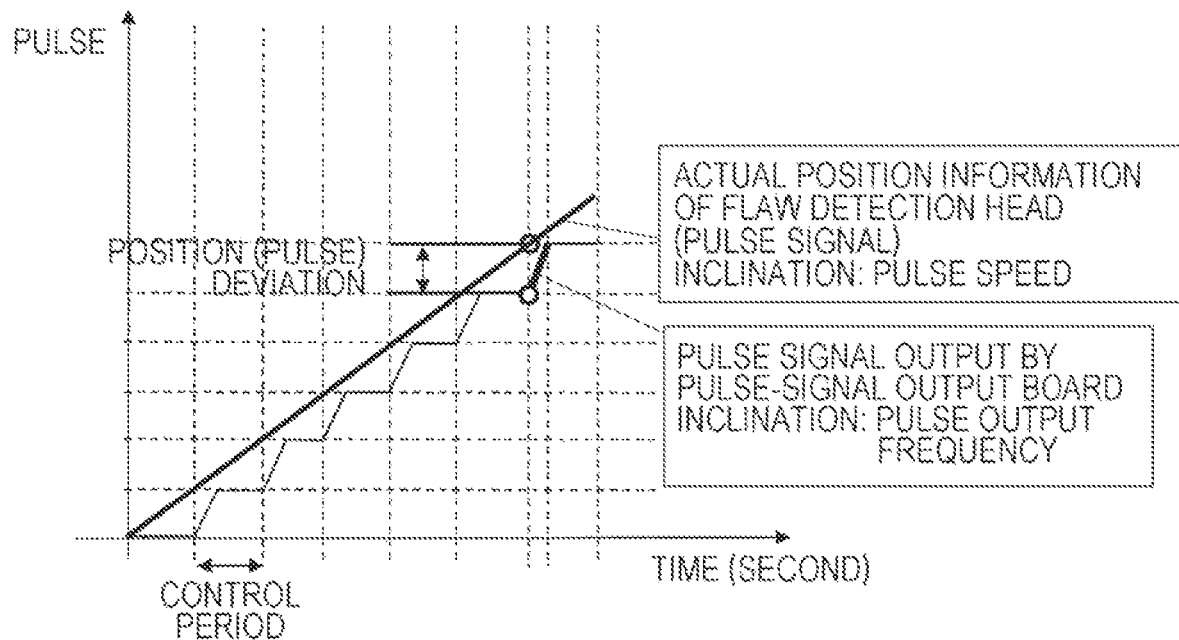
FIG. 4B is a graph illustrating another example of the relationship between pulse and time for describing the amount of change in the positions of the flaw detection heads that are updated in each control period.

In contrast, when the frequency of the pulse signal generated by the pulse-signal output board 72 is higher than 500 Hz, changes in the positions of the flaw detection head 35 with time received by the inspection sensor (probe) become discontinuous (stepwise). There may be a case where the position information is not updated within the range of the display resolution of 2 mm due to incidental factors such as variations in a stroke-position acquisition timing that depends on the specifications of a linear slider for scanning the probe and a pulse output command timing that depends on the control period of the on-board computer 21. The relationship between the actual position information of the flaw detection head (pulse signal) and the pulse signal output by the pulse-signal output board 72 in this case is illustrated in FIG. 4B.

As seen from these results, it is preferable that the output frequency of the pulse signal generated by the pulse-signal output board 72 be set so as to synchronize with the product of the acquiring frequency of flaw detection data, i.e., the number of acquisitions of flaw detection data per unit time (times/sec) set by the inspection device 15, the pulse resolution (pulse/mm), and the display resolution of the flaw detection map (mm/times). It is further preferable that the mechanical scanning speed of the flaw detection head 35 be equal to or lower than an upper speed limit that is calculated by multiplying the display resolution of the flaw detection map (the display resolution of inspection results) and the acquiring frequency of flaw detection data.

Figure 5:
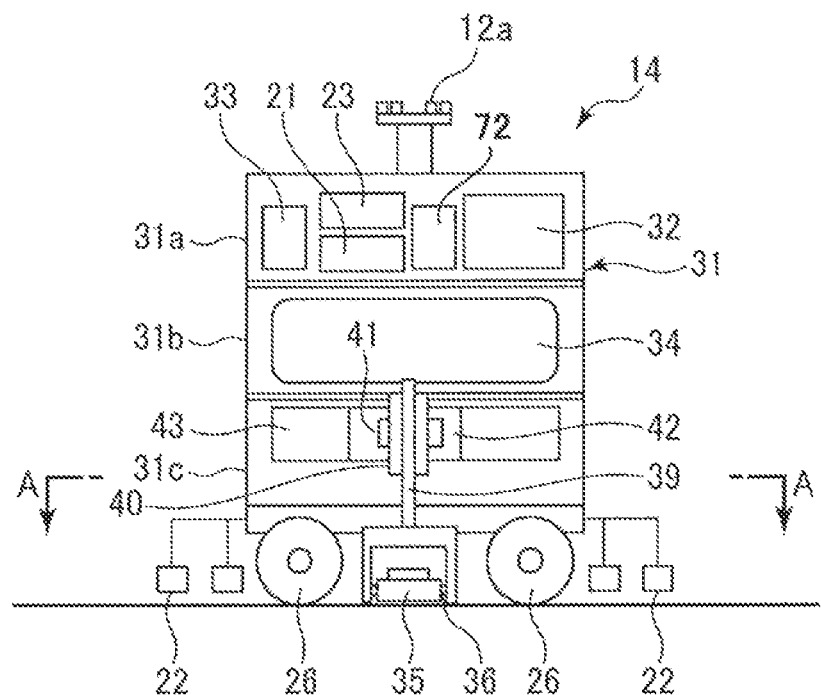
FIG. 5 is a side view illustrating a carriage that is used in an autonomous metal-plate inspection apparatus according to the first embodiment.
Figure 6:
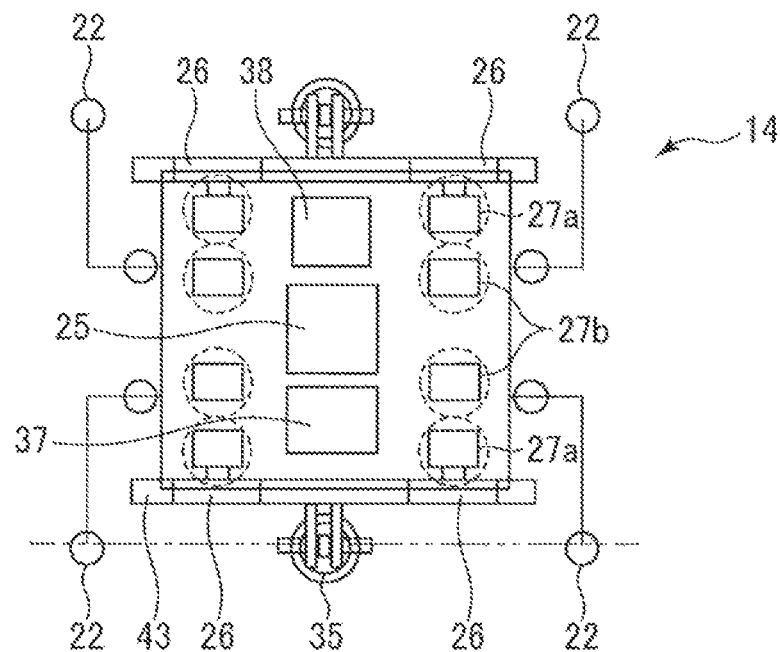
FIG. 6 is a horizontal cross-sectional view of the carriage used in the autonomous metal-plate inspection apparatus according to the first embodiment taken along line A-A.
Figure 7:
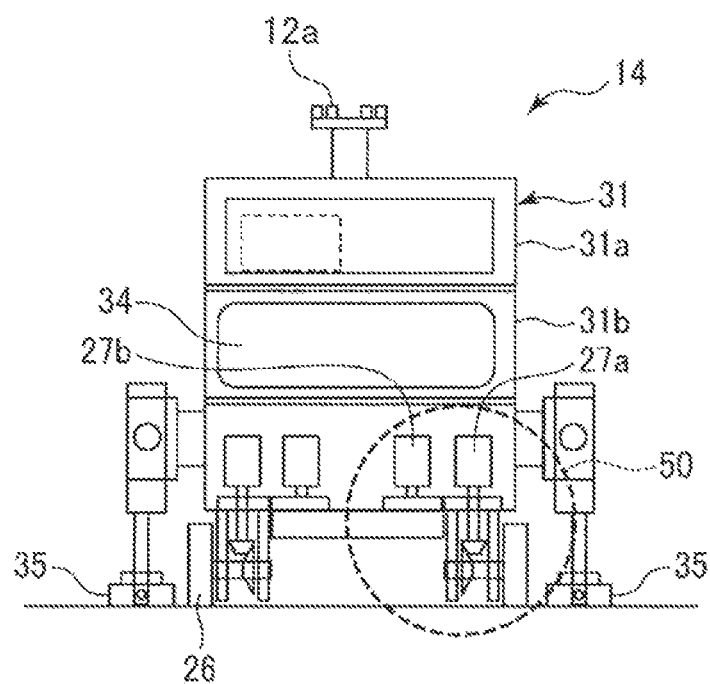
FIG. 7 is a front view illustrating the carriage used in the autonomous metal-plate inspection apparatus according to the first embodiment.
Figure 8:
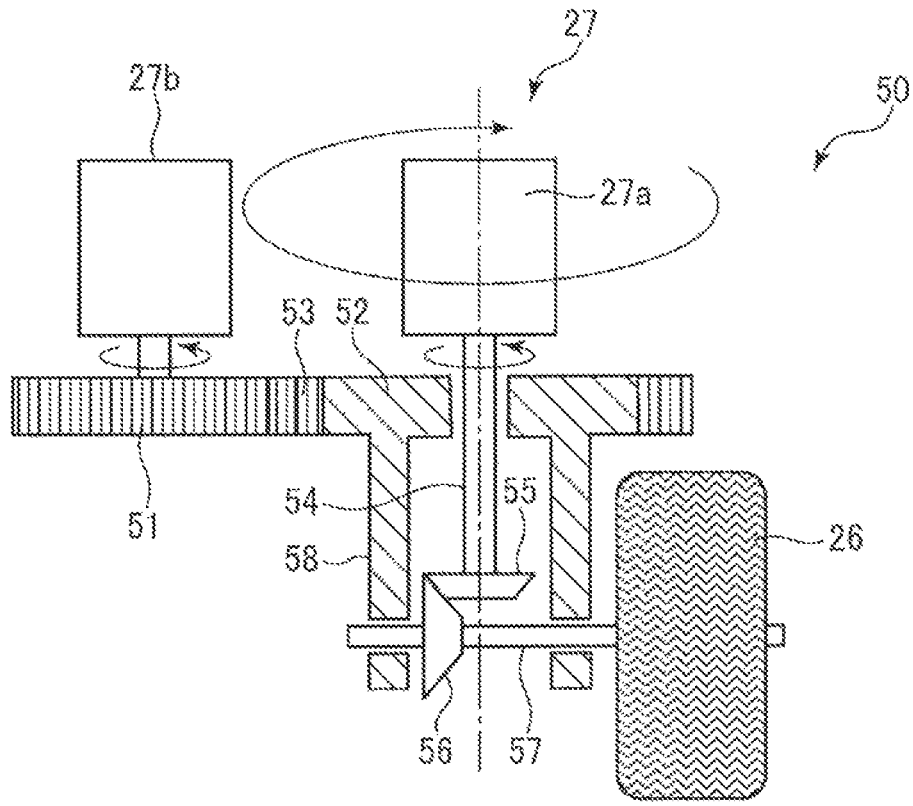
FIG. 8 is a cross-sectional view illustrating, in an enlarged manner, a driving unit of the carriage used in the autonomous metal-plate inspection apparatus according to the first embodiment.

The physical configuration of the carriage 14 that is a principal portion of the autonomous metal-plate inspection apparatus will now be described. FIG. 5 is a side view of the carriage 14, FIG. 6 is a horizontal cross-sectional view taken along line A-A of FIG. 5, and FIG. 7 is a front view of the carriage 14. FIG. 8 is a cross-sectional view illustrating a driving unit of the carriage 14 in an enlarged manner.

The carriage 14 includes a carriage main body 31, and the carriage main body 31 is divided into an upper tier portion 31a, a middle tier portion 31b, and a lower tier portion 31c.

In the upper tier portion 31a, the navigational receiver 12a, the on-board computer 21, the IO board 23, and the pulse-signal output board 72, which are described above, are arranged. In addition, an ultrasonic flaw detector 32 and a wireless communication unit 33 that are included in the inspection device 15 are arranged.

In the middle tier portion 31b, a water tank 34 that serves as water supply means is disposed. When the metal plate 10 is inspected by ultrasonic testing, the space between the probe and the metal plate 10 needs to be always filled with water, and thus, water is continuously supplied from the water tank 34 to the space between the probe and the metal plate via a water supply hose (not illustrated). Note that the water tank has a limited capacity, and thus, water may be supplied from an external water source by using a hose.

The edge detection sensors 22 are arranged around the lower tier portion 31c. In the lower tier portion 31c, the wheels 26 for travelling, the drive control unit 25, wheel drive motors 27a and turning motors 27b that are included in the wheel motors 27, the flaw detection head 35 included in the inspection device 15, an edge-detection-sensor controller 37, and a battery 38 are arranged.

In the case where water is supplied from an external water source by using a hose, it is preferable to use a supply method in which the hose does not hinder the operation of a robot as a result of becoming caught on an end portion of a target member of flaw detection and in which the water supply will not be stopped due to a kink in the hose. For example, supports are provided around a flaw-detection work area, and a rail having a plurality of cable hangers for hanging a hose on is fixed to the supports in such a manner that the rail can be swivelled, so that the hose can be supplied from an upper portion of a robot along the cable hangers. The tension that is exerted on the hose as a result of movement of the robot causes the rail to swivel, and the cable hangers slide on the rail, so that stable water supply can be performed without hindering the movement of the robot.

In this case, along with the water supply using a hose, power supply and signal supply can also be performed by using a cable. In this case, for example, the on-board computer 21 may not be included in the robot and may be stored in, for example, a control panel that is installed near the work area. The on-board computer 21 and the robot may be connected to each other by a communication cable, so that the configuration of a main body of the robot can be simplified, and the robot can be reduced in weight. In addition, by using wired communication instead of providing the wireless communication unit 33, the instability of wireless communication due to environmental disturbances or the like can be eliminated, and a highly reliable system configuration can be obtained. Furthermore, by using a cable to enable power supply for driving the main body of the robot and supply of power to the inspection sensor (probe) included in the robot from the outside, it is not necessary to provide the battery 38. Further, a trouble such as abnormal stoppage due to battery exhaustion can be prevented from occurring.

Each of the flaw detection head 35 includes the probe, which is the inspection sensor that scans the inspection region of the metal plate 10, and are supported by a flaw-detection-head support mechanism 36. The flaw detection head 35 is attached to a vertical shaft 39 with the flaw-detection-head support mechanism 36 interposed therebetween, and the vertical shaft 39 is movable in the vertical direction along a vertical rail 40. In addition, the vertical shaft 39 is attached to a horizontal rail 42 by an attachment portion 41, and the horizontal rail 42 is scanned along a horizontal scanning shaft 43 by the scanning actuator 24 (not illustrated in FIG. 5, FIG. 6, and FIG. 7).

Each of the edge detection sensors 22 is typically formed of, a vortex sensor, and as a result, the edge detection sensors 22 detect plate ends of the metal plate 10 when the carriage 14 is autonomously travelling on the metal plate 10 and prevent the carriage 14 from running off and falling from the metal plate 10. In addition, the edge detection sensors 22 are used as sensors for enabling the carriage 14 to travel along the plate ends when the carriage 14 performs flaw detection of the plate ends during the flaw detection of the four peripheral portions of the metal plate. For example, as illustrated in FIG. 6, regarding each of the sides on which the flaw detection heads 35 are disposed, two of the edge detection sensors 22 are arranged so as to be in line with the corresponding flaw detection head 35. By controlling the direction of movement of the carriage 14 in such a manner that the two edge detection sensors 22 constantly detect a plate end, scanning along the plate end can be performed. Similarly, regarding each of the sides on which the flaw detection heads 35 are not disposed, two of the edge detection sensors 22 are arranged on the left and right sides.

The four wheels 26 are arranged independently of one another on the bottom of the carriage 14 so as to be capable of being driven and turned by 90 degrees or more. These wheels 26 enable omnidirectional control. The operational states of a plurality of wheel motors are determined by using motor encoders (not illustrated) each of which corresponds to one of the wheel motors, and then, omnidirectional control that is used in a normal control of a robot is performed by using detected signals.

Driving units 50 are each provided for one of the wheels so as to drive the wheels independently of one another. As illustrated in FIG. 8, the wheel drive motor 27a serving as a first driving system and the turning motor 27b serving as a second driving system for steering are included as the wheel motors 27 in each of the driving units 50. A pinion gear 51 is attached to a shaft of the turning motor 27b for steering, and the pinion gear 51 meshes with a rack gear 53 provided on the outer periphery of a steering turntable 52.

A housing (not illustrated) of the wheel drive motor 27a is mounted on an upper portion of the steering turntable 52, and an output rotary shaft 54 of a reduction gear of the wheel drive motor 27a extends downward through the steering turntable 52. A first intersecting shaft gear 55 is coupled to a lower end of the output rotary shaft 54. A second intersecting shaft gear 56 meshes with the first intersecting shaft gear 55, and the second intersecting shaft gear 56 is coupled to a shaft member 57 of the wheel 26. The shaft member 57 is rotatably supported by a suspension structure 58 that extends downward from the steering turntable 52.

Thus, each of the wheel drive motors 27a rotates the corresponding wheel 26, and each of the turning motors 27b turns the corresponding wheel 26 together with the steering turntable 52 and the suspension structure 58. Each of the wheel drive motors 27a can rotate the corresponding wheel in a forward direction and in a reverse direction. Each of the turning motors 27b is perpendicular to the surface of the metal plate on which the carriage 14 travels and can turn 90 degrees or more about an axis that is offset toward the center of the carriage with respect to the corresponding wheel 26.

Figure 9A:
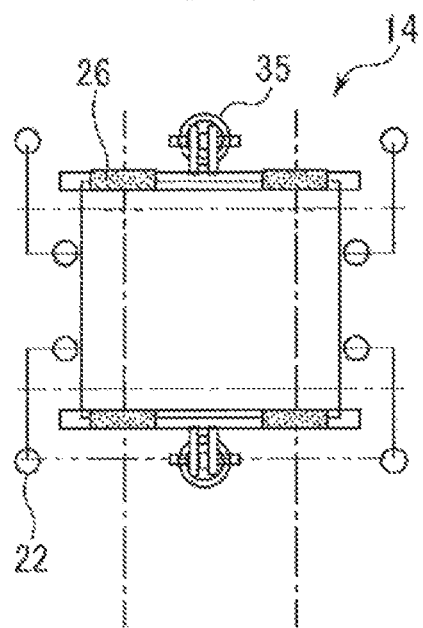
FIG. 9A is a schematic diagram illustrating a steering state when the autonomous metal-plate inspection apparatus moves side to side.
Figure 9B:
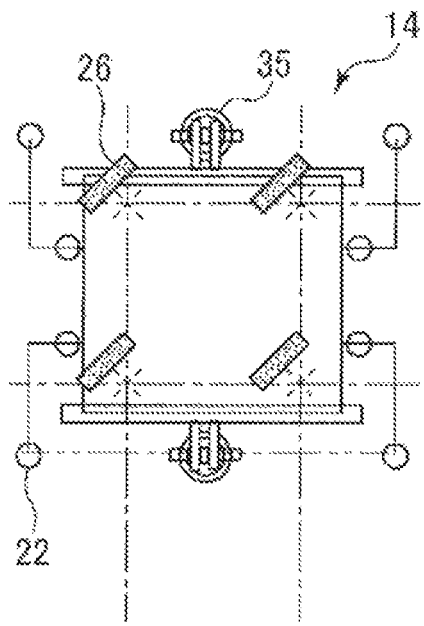
FIG. 9B is a schematic diagram illustrating a steering state when the autonomous metal-plate inspection apparatus moves obliquely.
Figure 9C:
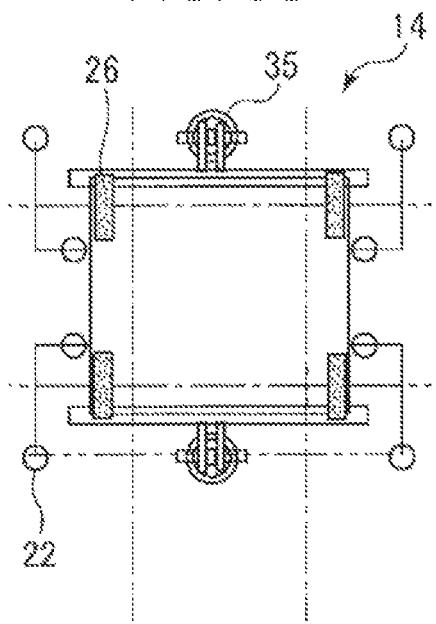
FIG. 9C is a schematic diagram illustrating a steering state when the autonomous metal-plate inspection apparatus moves back and forth.
Figure 9D:
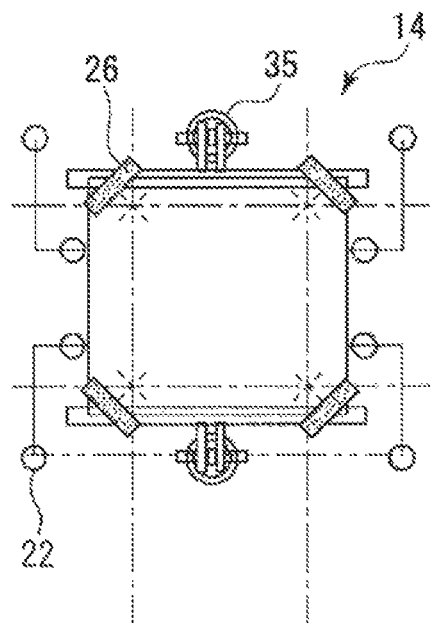
FIG. 9D is a schematic diagram illustrating a steering state when the autonomous metal-plate inspection apparatus makes a spin turn.

A steering pattern that determines the direction of movement of the autonomous metal-plate inspection apparatus will now be described. FIGS. 9A to 9D are diagrams illustrating the steering pattern. FIG. 9A illustrates a steering state in a side-to-side movement. FIG. 9B illustrates a steering state in an oblique movement. FIG. 9C illustrates a steering state in a back-and-forth movement. FIG. 9D illustrates a steering state in a spin turn. Note that the term "spin turn" refers to the case where a vehicle with treads (crawlers) such as a hydraulic shovel or a tank changes the attitude of the vehicle body without moving by rotating the left and right crawlers at the same speed in opposite directions.

Figure 10:
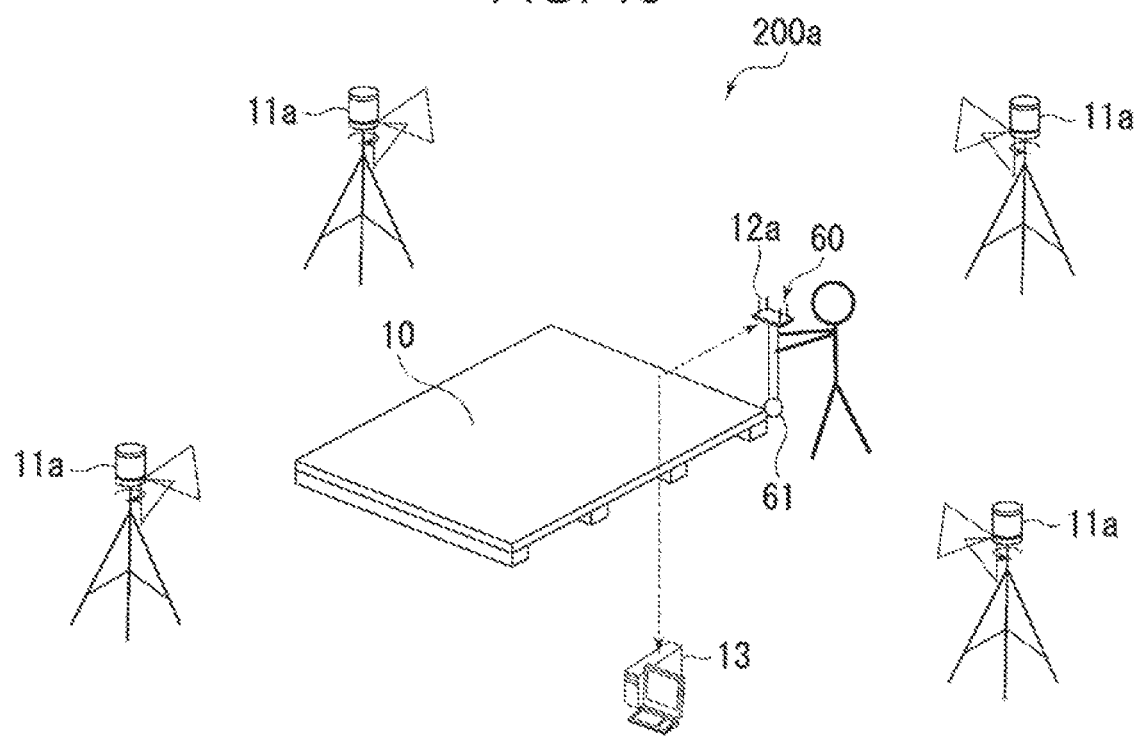
FIG. 10 is a diagram illustrating a method of acquiring information regarding a position and an attitude of a metal plate.
Figure 11:
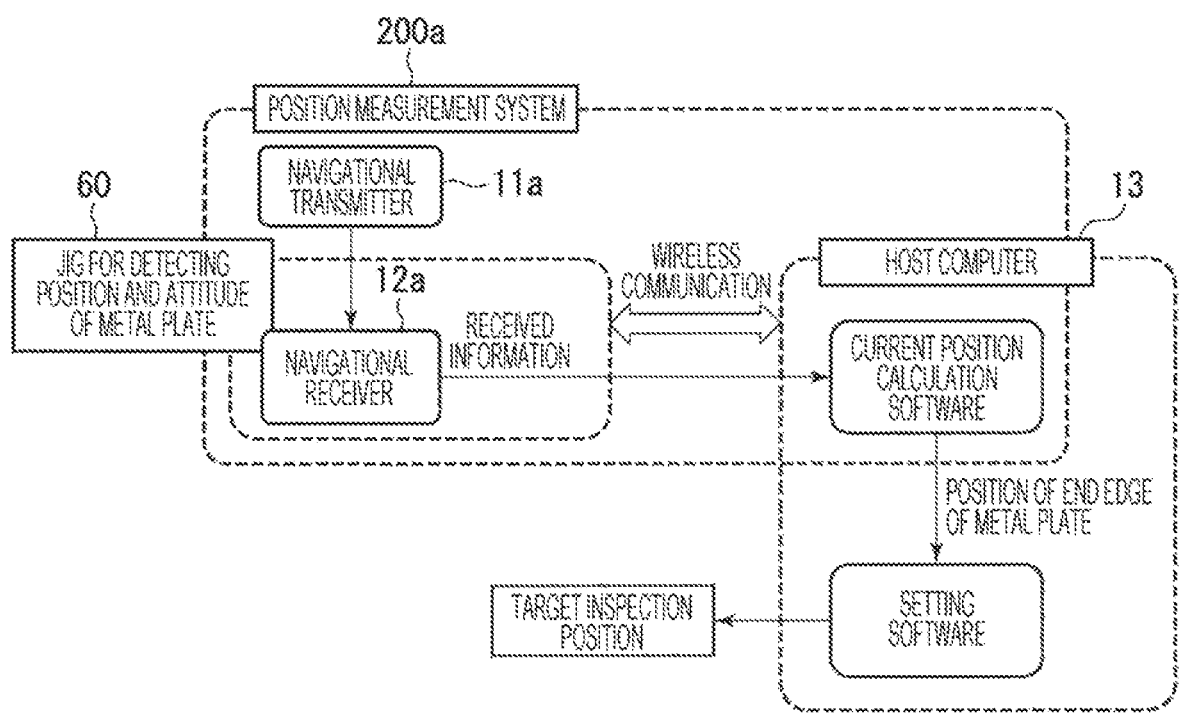
FIG. 11 is a diagram illustrating a system configuration when the information regarding the position and the attitude of the metal plate is acquired.

An inspection operation performed by the autonomous metal-plate inspection apparatus 300a using the position measurement system 200a according to the first embodiment will now be described. First, acquisition of information regarding the position and the attitude of the metal plate in a process prior to setting of a target inspection position and an inspection path will be described. FIG. 10 is a diagram illustrating a method of acquiring information regarding a position and an attitude of the metal plate. FIG. 11 is a diagram illustrating a system configuration in this case.

As illustrated in these drawings, here, a contact probe 61 of a jig 60 that is used for detecting a position and an attitude of a metal plate is set at the position of a corner of the metal plate 10, which is a measurement target, so as to measure the position. The navigation receiver 12a of the position measurement system 200a attached to the jig 60. In this case, in order to measure coordinates of the contact position with high accuracy, the geometric positional relationship between the navigational receiver 12a and the contact probe 61 is usually determined with a high accuracy within ±50 micrometers. In the position measurement system 200a, information regarding the position (X, Y, Z) and the attitude ($\theta x$, $\theta y$, $\theta z$) of the navigational receiver 12a is obtained. If the positional relationship between the navigational receiver 12a and the contact probe 61 is determined, an operation of converting the position information of the navigational receiver 12a into the position information at the position of the contact probe 61.

Figure 12:
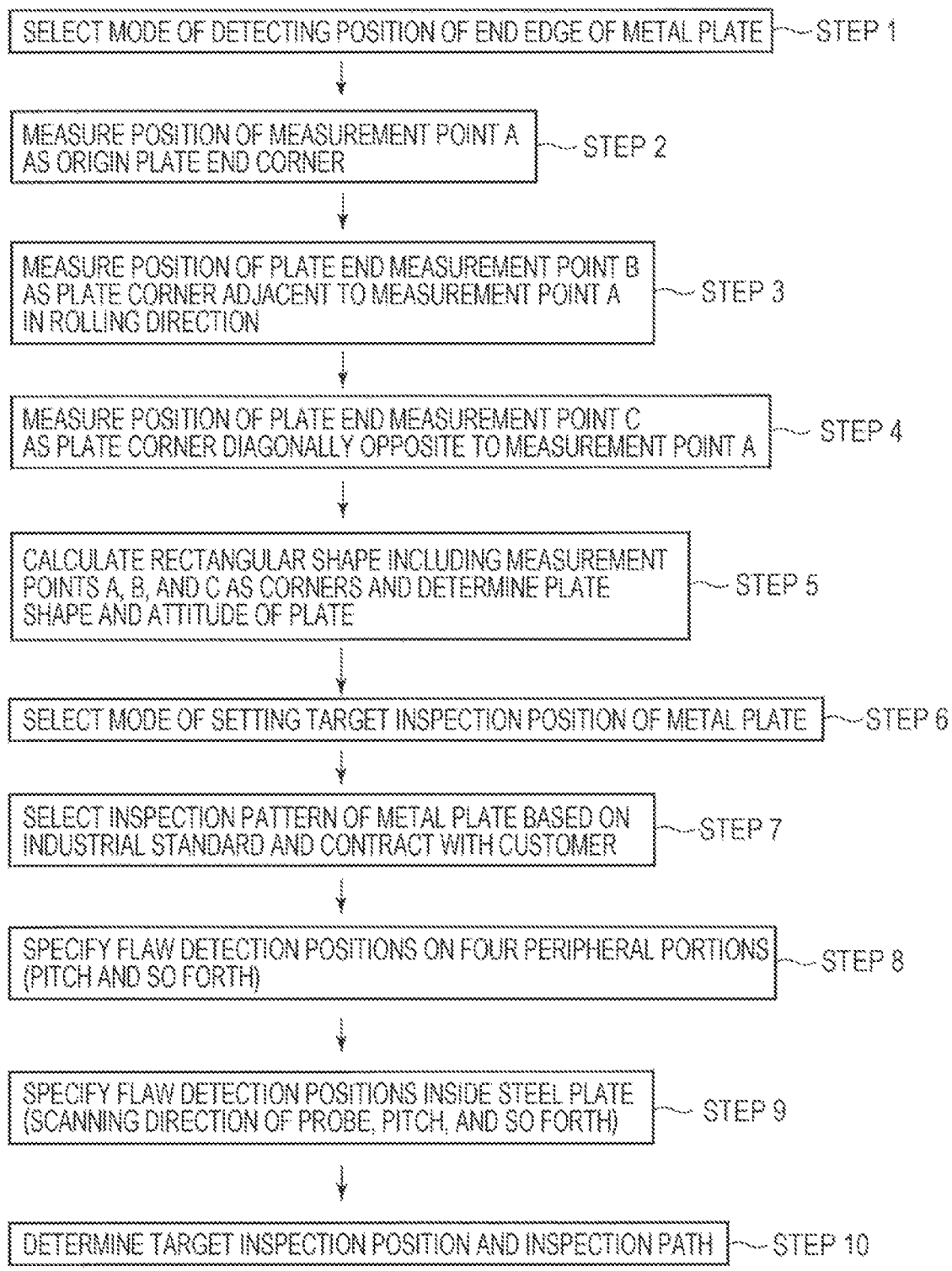
FIG. 12 is a flowchart of a method of detecting the position and the attitude of the metal plate and setting a target position and an inspection path.
Figure 13:
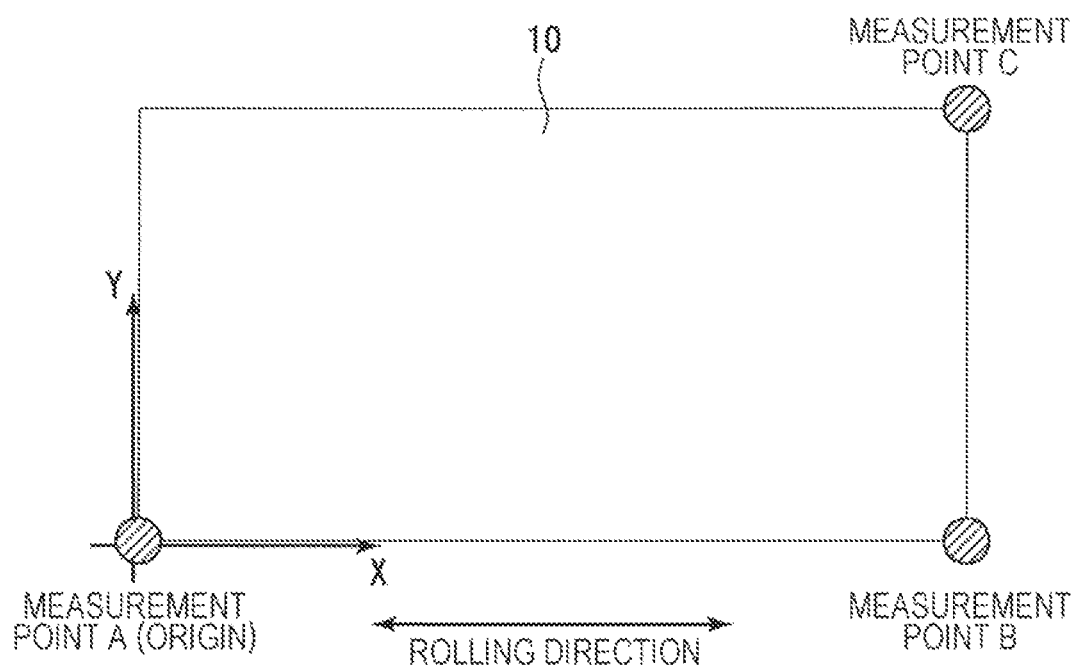
FIG. 13 is a diagram illustrating a coordinate system that is set on the basis of measurement points at plate ends of the metal plate in the flow of an operation of detecting the position and the attitude of the metal plate.

In FIG. 12, steps 1 to 5 are included in a flowchart for detection of a position and an attitude of a metal plate. FIG. 13 is a diagram illustrating a coordinate system that is set on the basis of measurement points at plate ends of the metal plate in the flow of an operation of detecting the position and attitude of the metal plate. First, a mode of detecting the position of an end edge of the metal plate is selected on an operation screen of the host computer 13, which is included in the position measurement system 200a (step 1). Then, the position of a measurement point A is measured as an origin plate end corner by using a jig that is used for detecting a position and an attitude of a metal plate (step 2). Subsequently, the position of a plate end measurement point B is measured as a plate corner that is adjacent to the measurement point A in the rolling direction (step 3). After that, the position of a plate end measurement point C is measured as a plate corner that is diagonally opposite to the measurement point A (step 4). In the manner described above, the positions of end edges at at least three of the four corners of the metal plate are determined, and then, a rectangular shape including these three points as its corners is calculated, so that the position and the attitude of the metal plate can be determined. The host computer 13 calculates the position and the attitude of the metal plate assuming a rectangular shape that includes, as its three corners, coordinate data of the measurement positions of the above-mentioned measurement points A (origin), B, and C. A coordinate system in which the measurement point A is the origin and in which the direction of a vector from the measurement point A to the measurement point B and a direction perpendicular to the direction are respectively the X direction and the Y direction is set (step 5). Note that this coordinate system will hereinafter be referred to as a metal-plate coordinate system.

Note that the metal plate is not necessarily has a rectangular shape. Therefore, the position and the attitude of the metal plate may be detected, assuming that the metal plate does not have a rectangular shape, by forming a quadrangular shape connecting the four corners of the metal plate with a line.

Note that, in the second embodiment, the above-mentioned contact probe 61 may be included in a jig that is used for detecting a position and an attitude of a metal plate and to which the navigational transmitter 12b of the position measurement system 200b is attached. The contact probe 61 may be set at the position of a corner of the metal plate 10, which is a measurement target, so as to measure the position.

A method of setting a target inspection position and an inspection path will now be described. In FIG. 12, steps 6 to 10 are included in a flowchart of a method of setting a target inspection position and an inspection path. After the metal-plate coordinate system has been set as described above, in the setting software 17 in the host computer 13, a mode of setting a target inspection position of the metal plate is selected (step 6), and an inspection pattern of the metal plate is selected on the basis of an industrial standard and a contract with a customer (step 7). Subsequently, on the software, flaw detection positions, a flaw detection pitch, and the number of flaw detections are specified for flaw detection of the four peripheral portions of the metal plate (step 8), and flaw detection positions, the scanning direction of a probe, and a pitch are specified for flaw detection that is performed for the inside of a steel plate (step 9). The software sets, on the basis of these specified conditions and information regarding the position and the attitude of the metal plate, the target inspection position and the inspection path in the metal-plate coordinate system (step 10).

Figure 14A:
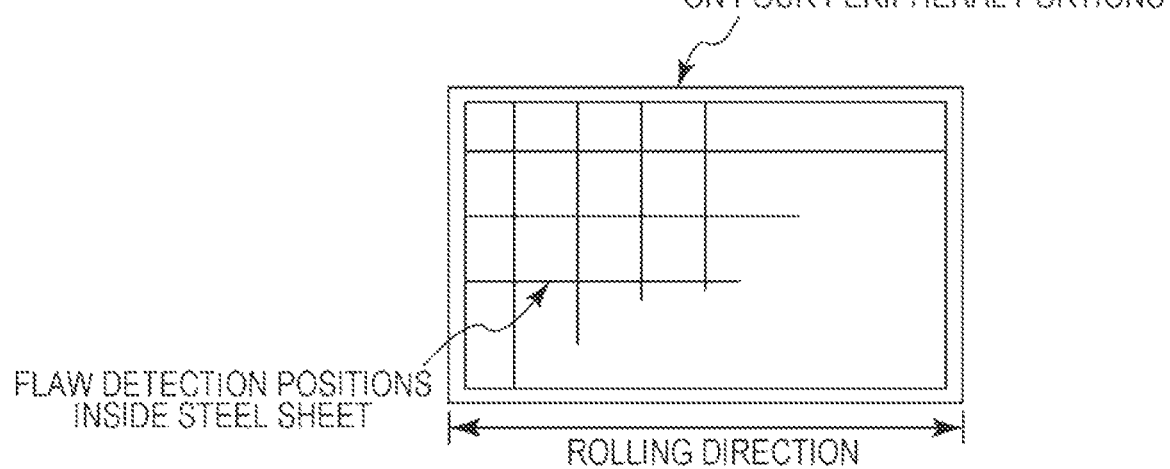
FIG. 14A is a diagram illustrating scanning classification and flaw detection positions that are defined in "7.6 flaw detection positions (scanning positions and areas)" of JIS G 0801 ultrasonic testing of steel plates for pressure vessels.
Figure 14B:
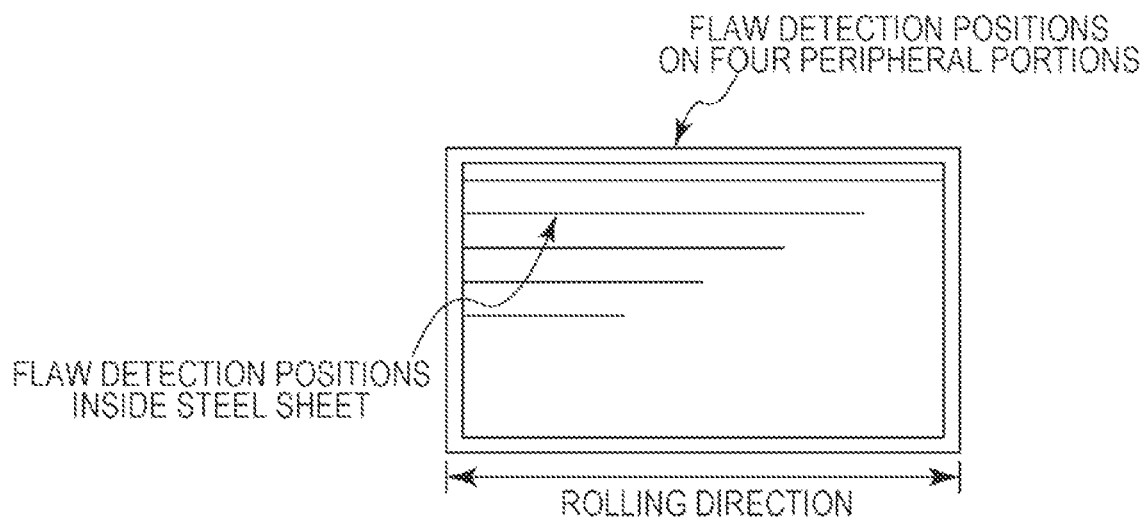
FIG. 14B is a diagram illustrating scanning classification and flaw detection positions that are defined in "7.6 flaw detection positions (scanning positions and areas)" of JIS G 0801 ultrasonic testing of steel plates for pressure vessels.
Figure 14C:
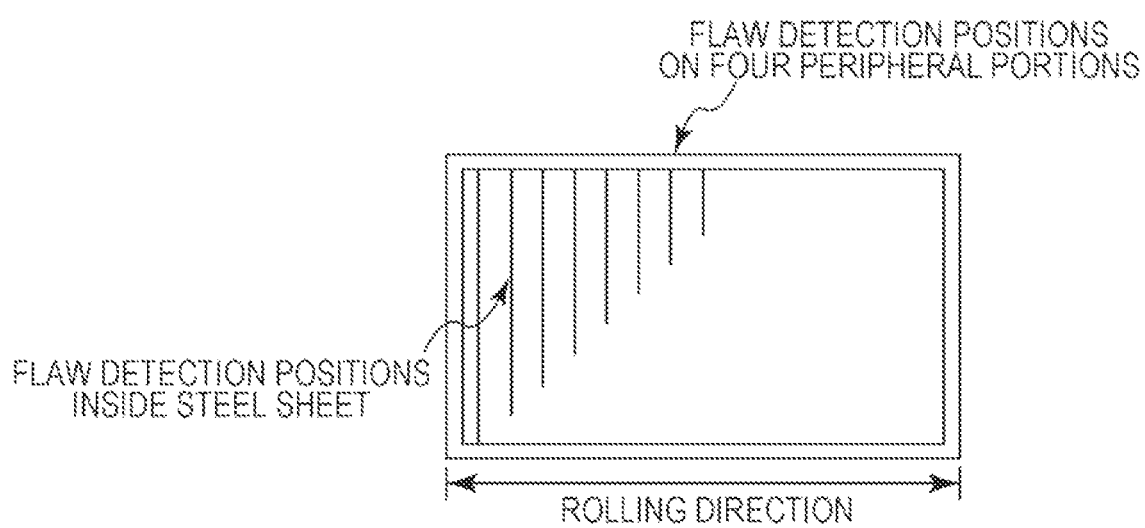
FIG. 14C is a diagram illustrating scanning classification and flaw detection positions that are defined in "7.6 flaw detection positions (scanning positions and areas)" of JIS G 0801 ultrasonic testing of steel plates for pressure vessels.

As an example of the inspection pattern, FIGS. 14A to 14C illustrate scanning classification and flaw detection positions that are defined in "7.6 flaw detection positions (scanning positions and areas)" of JIS G 0801 ultrasonic testing of steel plates for pressure vessels. FIG. 14A illustrates flaw detection positions in the case where flaw detection is performed in the rolling direction and a direction perpendicular to the rolling direction. FIG. 14B illustrates flaw detection positions in the case where flaw detection is performed in the rolling direction. FIG. 14C illustrates flaw detection positions in the case where flaw detection is performed in a direction perpendicular to the rolling direction. In the standard, four peripheral portions of a metal plate and the inside a steel plate are designated as flaw detection positions. There is a specification about a flaw detection pitch for four peripheral portions, and there are specifications about a flaw detection pitch and a scanning direction for the inside of a steel plate. Standards for such metal plate inspection are not limited to JIS, and there are various standards including overseas standards. Eventually, it is necessary to perform inspection based on a contract with a customer. Thus, in the above-mentioned selection of an inspection pattern, to prepare software for setting an inspection pattern beforehand as necessary enables flexible response to a customer's request.

Figure 15A:
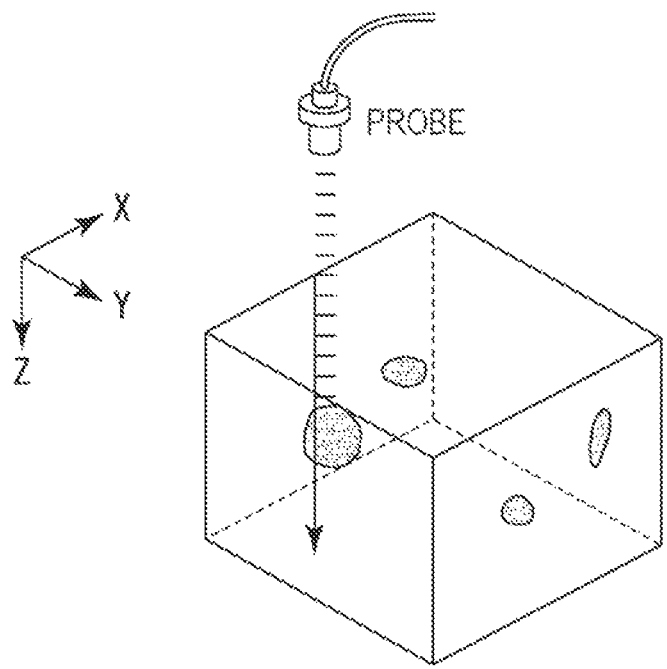
FIG. 15A is a conceptual diagram of an A-scope, which is primary information obtained in flaw detection.
Figure 15B:
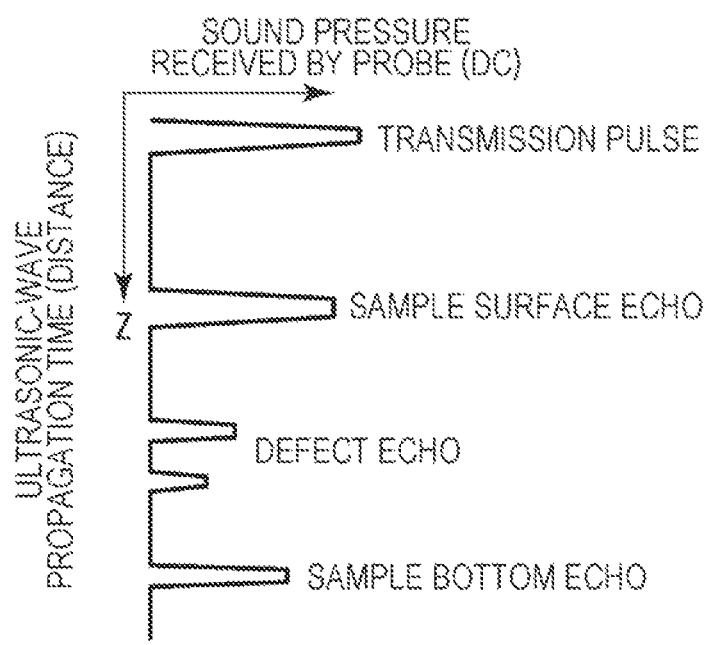
FIG. 15B is a graph illustrating a relationship between a sound pressure received by a probe and an ultrasonic-wave propagation time in an A-scope.
Figure 15C:
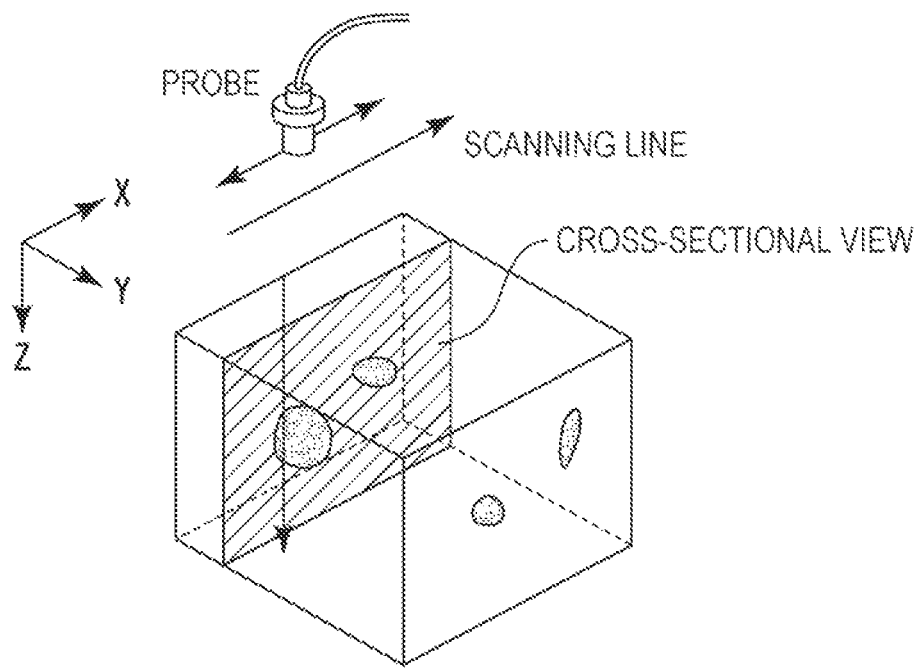
FIG. 15C is a conceptual diagram of a B-scope that provides a map-like display relating to a vertical cross-section of a target object of flaw detection in association with the A-scope and information regarding a scanning position.
Figure 15D:
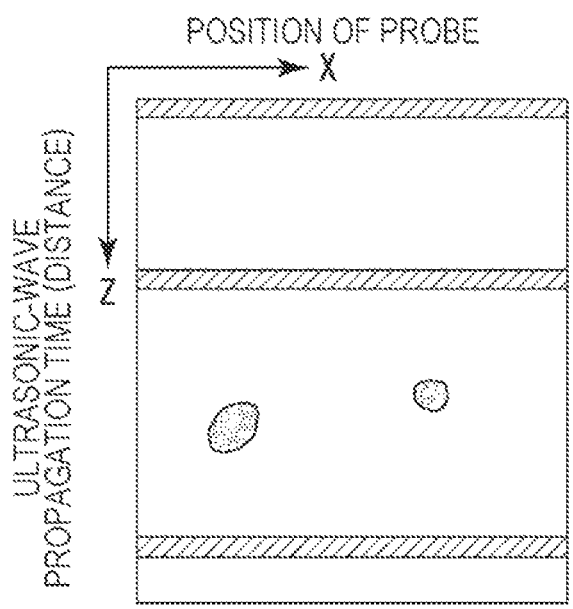
FIG. 15D is a conceptual diagram illustrating information that is obtained on an XZ plane of the target object of flaw detection in the B-scope.
Figure 15E:
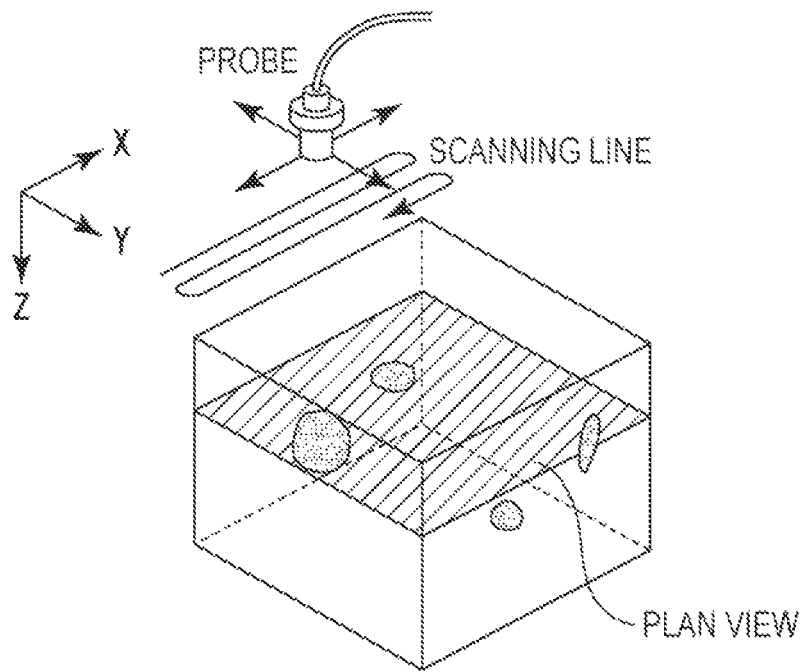
FIG. 15E is a conceptual diagram of a C-scope that provides a map-like display relating to a horizontal cross-section of the target object of flaw detection.
Figure 15F:
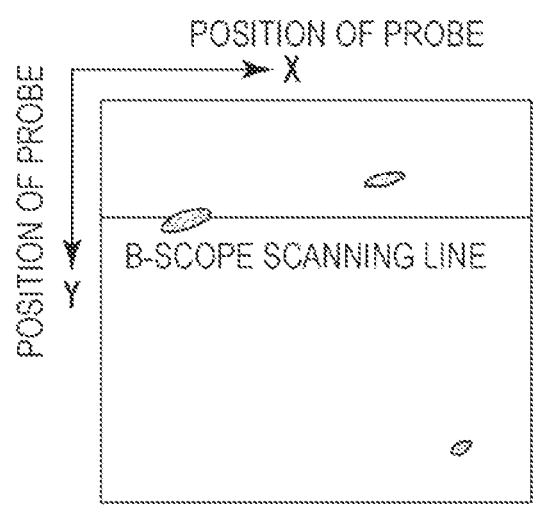
FIG. 15F is a conceptual diagram illustrating information that is obtained on an XY plane of the target object of flaw detection in the C-scope.

FIG. 15A is a conceptual diagram of an A-scope, which is primary information obtained in flaw detection. FIG. 15B is a graph illustrating a relationship between a sound pressure received by a probe and an ultrasonic-wave propagation time in an A-scope. FIG. 15C is a conceptual diagram of a B-scope that provides a map-like display relating to a vertical cross-section of a target object of flaw detection in association with the A-scope and information regarding a scanning position. FIG. 15D is a conceptual diagram illustrating information that is obtained on an XZ plane of the target object of flaw detection in the B-scope. FIG. 15E is a conceptual diagram of a C-scope that provides a map-like display relating to a horizontal cross-section of the target object of flaw detection. FIG. 15F is a conceptual diagram illustrating information that is obtained on an XY plane of the target object of flaw detection in the C-scope. An A-scope is obtained as the primary information in flaw detection and can extract information regarding "the magnitude of a defect" from an echo peak height and information regarding "the position of the defect in a depth direction" from an ultrasonic-wave propagation time. In FIGS. 15A, 15C and 15E, defect portions are indicated by halftone dots.

In the case where the phased array technique is used, the X-axis direction in FIGS. 15A, 15C, and 15E is the arrangement direction of the transducers, that is, the electronic scanning direction, and the Y-axis direction is the mechanical scanning direction. By controlling the focal length in the plate-thickness direction as mentioned above, the S/N ratio can be improved compared with the case of using the pulse reflection technique. In addition, inspection results include information in the plate-thickness direction in addition to positions in the X-axis direction and the Y-axis direction, and thus, the above-mentioned A to C-scopes can be obtained.

Although a method for determining "the magnitude of a defect" based on an echo peak height is defined in "9. Classifications and evaluations of flaws" in JIS G 0801 ultrasonic testing of steel plates for pressure vessels, at present, there is no rule for the display of "the position of a defect in a depth direction". However, for quality assurance and flexible response to a customer's request, it is necessary to comprehend the three-dimensional distribution of flaws in a steel plate, which is a product, including "the positions of defects in a depth direction".

Figure 16:
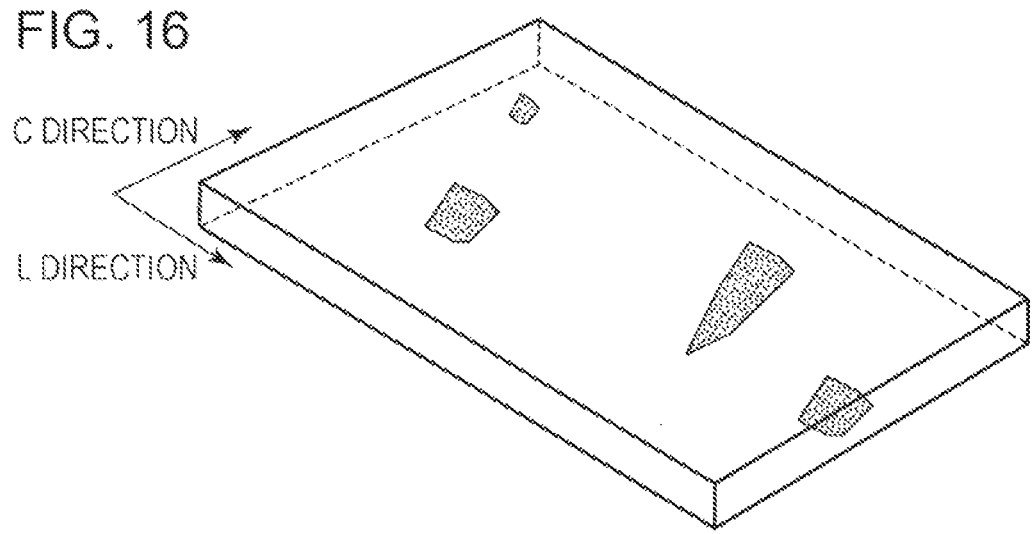
FIG. 16 is a diagram illustrating examples of flaws (defects) that are present in a metal plate.
Figure 17:
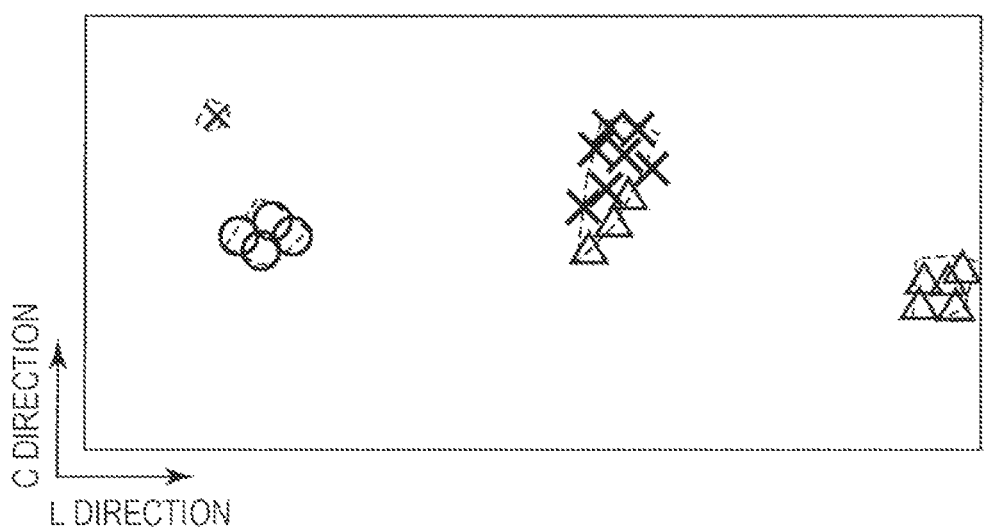
FIG. 17 is a diagram illustrating an example in which the positions of the flaws (defects) inside the metal plate illustrated in FIG. 16 are mapped on a plane of the metal plate and displayed.
Figure 18:
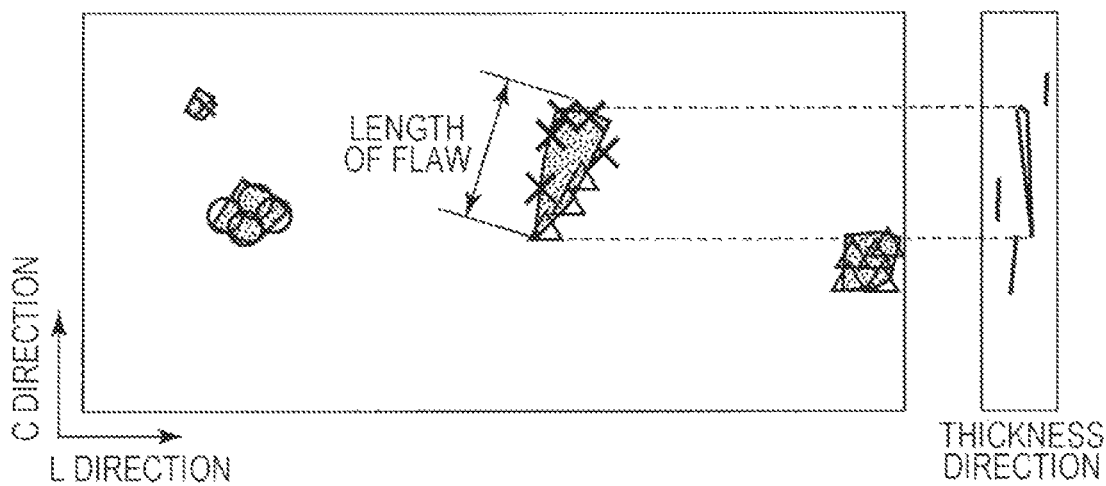
FIG. 18 is a diagram illustrating an example in which information regarding the positions of the flaws (defects) in a depth direction is added so as to further determine the positions of the flaws (defects) inside the metal plate in a thickness direction.

When scanning a probe to a target inspection position and along an inspection path, inspection is performed while the current position of the probe is determined, and flaw detection information associated with information regarding an inspection position on a plane of a metal plate is obtained. Thereby, the positions of defects can be accurately determined. For example, when there are flaws (defects) such as those indicated by halftone dots in FIG. 16 inside a metal plate, as illustrated in FIG. 17, the positions of the flaws (defects) inside the metal plate are mapped on a plane of the metal plate and displayed on the basis of flaw detection information associated with information regarding inspection positions. As a result, the two-dimensional positions of the flaws (defects) can be visualized, and defects can be easily determined. In addition, as illustrated in FIG. 18, the positions of the flaws (defects) inside the metal plate in the thickness direction can also be determined and can be three-dimensionally mapped on the plane of the metal plate and displayed. More specifically, a B-scope that provides a map-like display relating to a vertical cross-section of a target object of flaw detection in association with the A-scope and the information regarding the scanning position, and a C-scope that provides a map-like display relating to a horizontal cross-section can be obtained.

Acquisition of information regarding a position and an attitude of a metal plate by using the jig for detecting a position and an attitude of a metal plate, which includes the navigational receiver and the contact probe, is based on the premise that the shape of the metal plate is a rectangular shape. Thus, for example, if the metal plate is bent, there is a possibility that the position at which a plate end of the metal plate is detected by the above method will be different from the actual position of the plate end, and if the carriage travels on the basis of the target inspection position and the inspection path set on the premise that the metal plate has a rectangular shape, there is a possibility that the carriage will fall from the metal plate. Therefore, as described above, when flaw detection of four peripheral portions of the metal plate is performed, it is preferable that the carriage travel while being corrected by the edge detection sensors installed around the apparatus in addition to a target inspection position and an inspection path.

Figure 19:
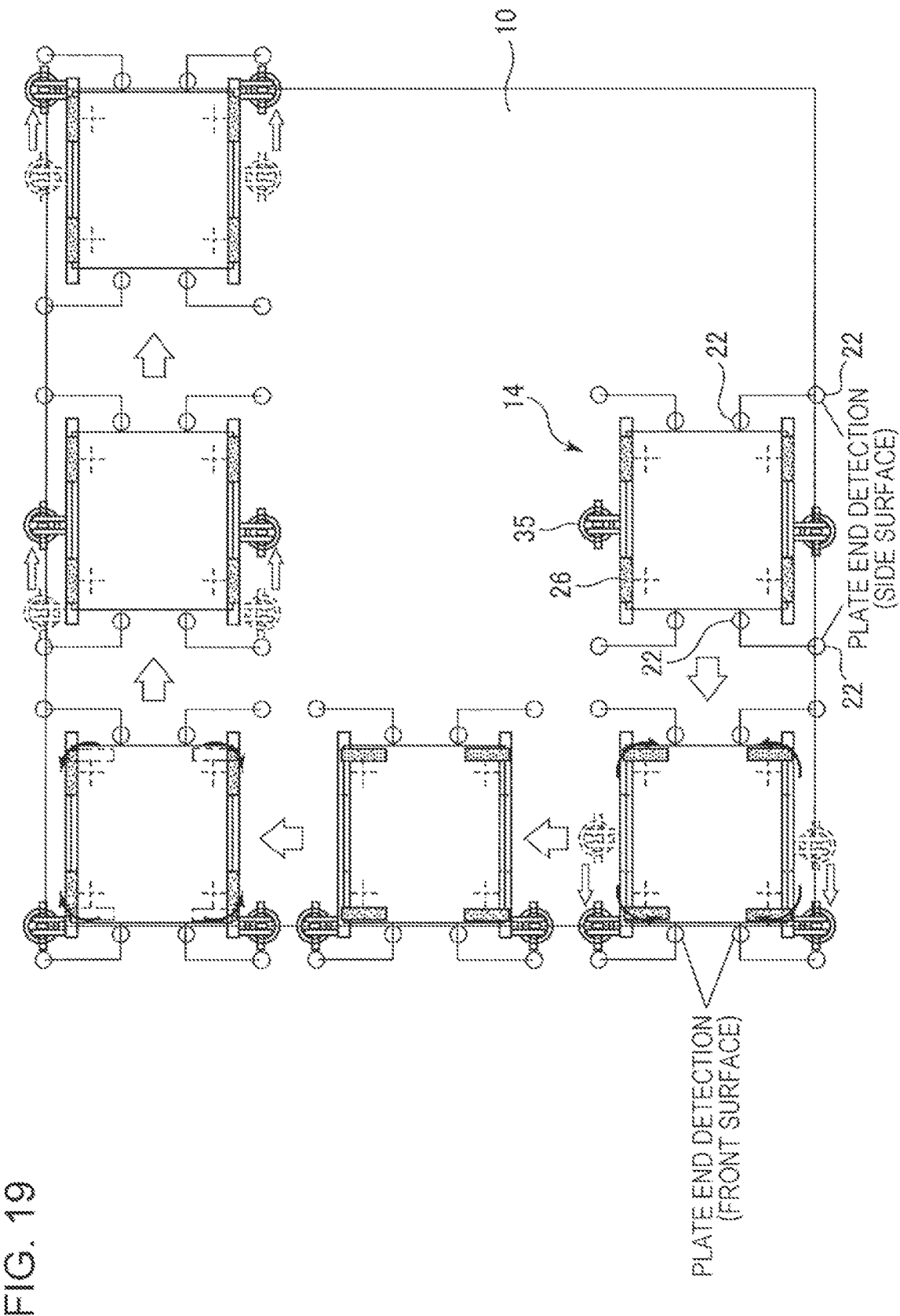
FIG. 19 is a diagram illustrating movement of a carriage when flaw detection of four peripheral portions of the metal plate is performed.

FIG. 19 is a diagram illustrating movement of the autonomous inspection apparatus (carriage) when flaw detection of the four peripheral portions of the metal plate is performed. (1) When a plate end on the lower side in FIG. 19 is inspected, the apparatus moves while the travelling direction thereof is controlled in such a manner that the two edge detection sensors 22 that are arranged on the side of the carriage 14 so as to be in line with the corresponding flaw detection head 35 constantly detect the plate end. (2) As the apparatus approaches the position of the plate end in the travelling direction on the basis of the target inspection position and the inspection path, the apparatus starts decelerating, and (3) eventually, the apparatus temporarily stops when the two edge detection sensors 22 that are arranged in front of the apparatus detect an edge of the metal plate 10. (4) Subsequently, the flaw detection head 35 is moved by the actuator (not illustrated) that causes the flaw detection head 35 to scan in the horizontal direction until the flaw detection head 35 reaches the position of the plate end. (5) The apparatus drives the turning motor (not illustrated) while not moving and steers the wheels 26 in a direction perpendicular to the above travelling direction. (6) The apparatus is moved forward and inspects the plate edge on the left-hand side in FIG. 19. This process is repeated until a predetermined flaw detection of the four peripheral portions is completed.

Figure 20A:
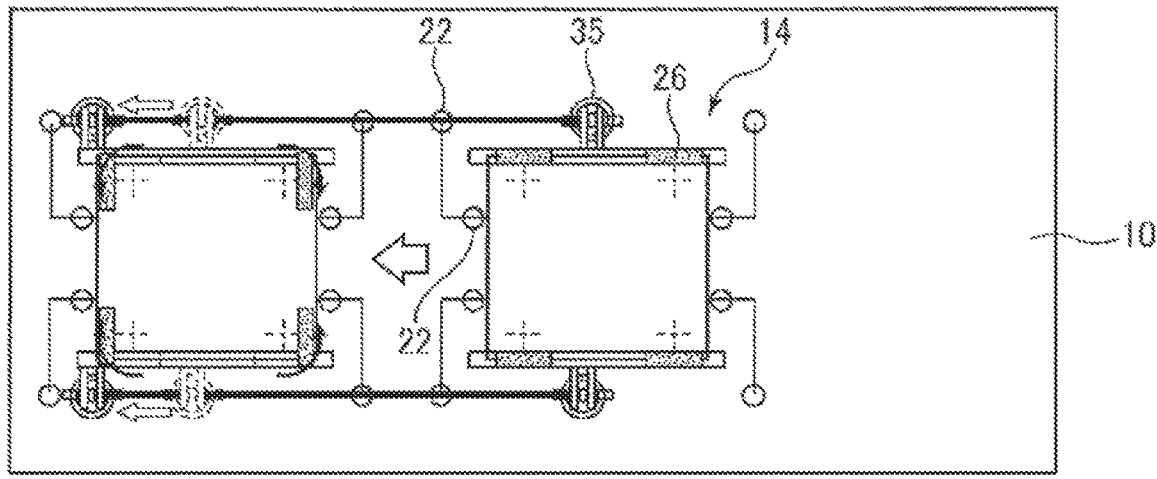
FIG. 20A is a diagram illustrating movement of the carriage toward the left-hand side when flaw detection is performed for the inside of the metal plate.
Figure 20B:
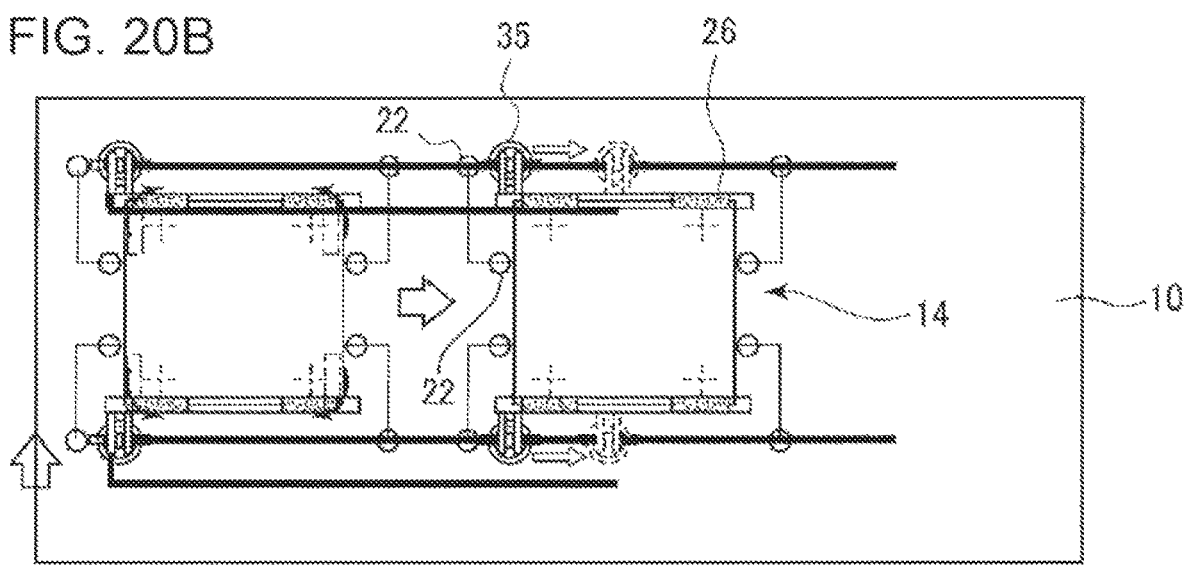
FIG. 20B is a diagram illustrating movement of the carriage toward the right-hand side a when flaw detection is performed for the inside of the metal plate.

FIGS. 20A and 20B are diagrams illustrating movement of the autonomous inspection apparatus (carriage) when flaw detection is performed for the inside of the metal plate. The inspection of the inside of the metal plate 10 does not depend on a plate edge and is performed on the basis of the target inspection position and the inspection path, which have been mentioned above. A target carriage position and a target scanning amount of the actuator (not illustrated) to scan the flaw detection head 35 are set in accordance with the target inspection position and path, and control relating to driving and steering of the wheels 26 and scanning of the scanning actuator 24 are performed.

Figure 21A:
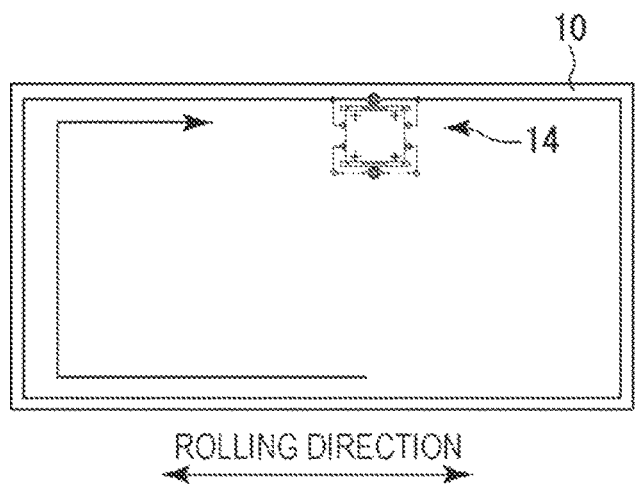
FIG. 21A is a diagram illustrating an inspection position and an inspection path when flaw detection of the four peripheral portions of the metal plate is performed twice.
Figure 21B:
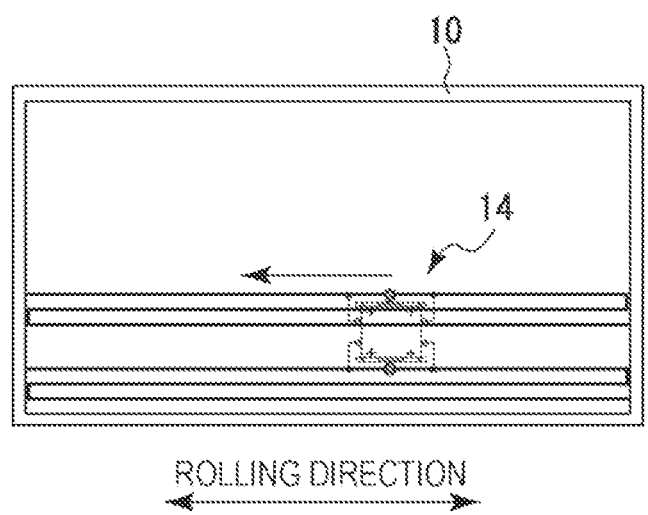
FIG. 21B is a diagram illustrating an inspection position and an inspection path when the inside of the metal plate is inspected in a rolling direction.
Figure 21C:
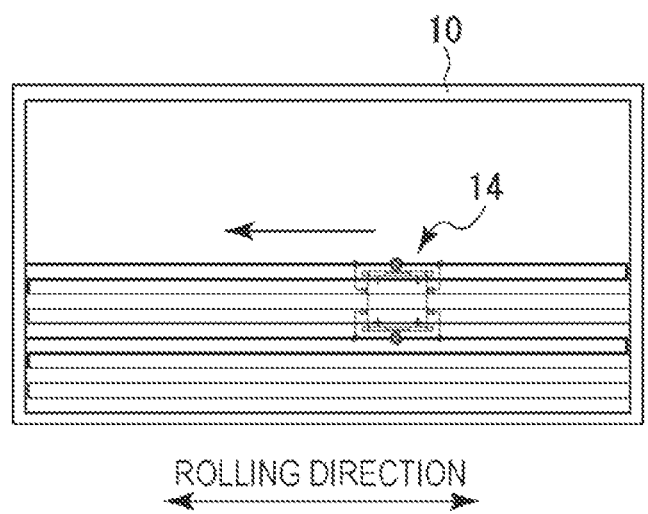
FIG. 21C is a diagram illustrating an inspection position and an inspection path when the inside of the metal plate is inspected in the rolling direction.
Figure 21D:
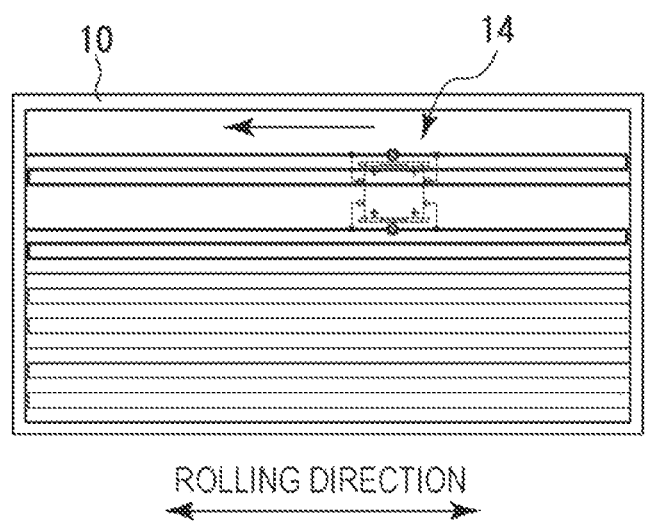
FIG. 21D is a diagram illustrating an inspection position and an inspection path when the inside of the metal plate is inspected in the rolling direction.
Figure 21E:
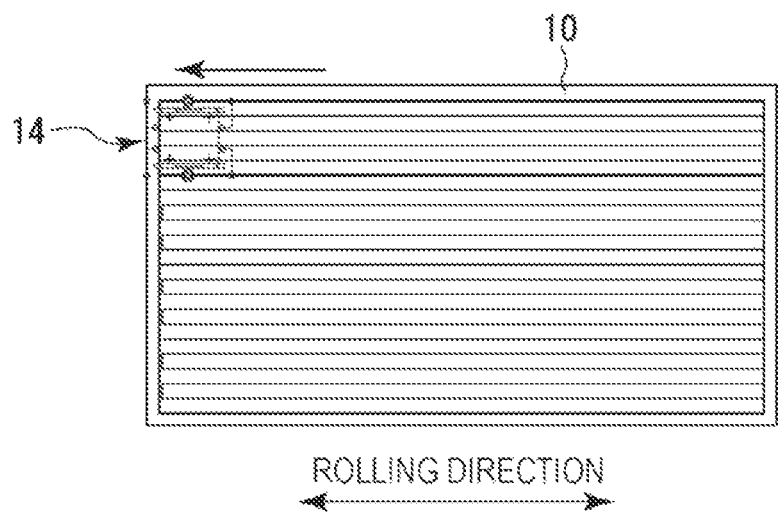
FIG. 21E is a diagram illustrating an inspection position and an inspection path when the inside of the metal plate is inspected in the rolling direction.
Figure 22:
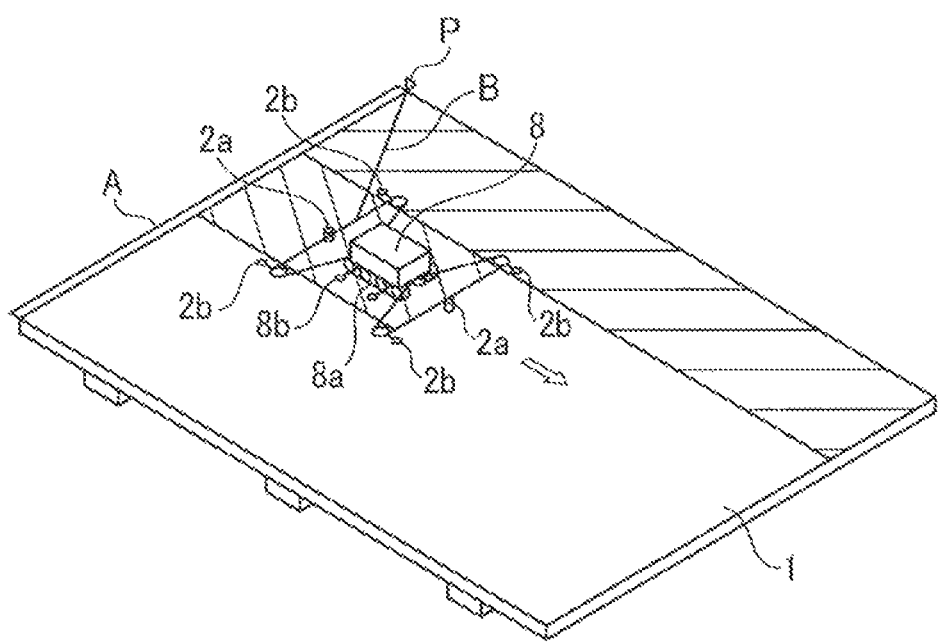
FIG. 22 is a diagram illustrating an autonomous inspection apparatus of the related art.

FIGS. 21A to 21E are diagrams illustrating an inspection position and an inspection path when flaw detection of the four peripheral portions of the metal plate and an inspection of the inside of the metal plate are performed. In the case illustrated in FIGS. 21A to 21E, first, as illustrated in FIG. 21A, flaw detection of the four peripheral portions of the metal plate is performed twice, that is, on the plate ends and on an area 75 mm inward from the plate ends, and then, as illustrated in FIGS. 21B to 21E, the inspection is performed in the rolling direction such that adjacent scanning lines are at a pitch of 50 mm.

As described above, according to the first embodiment, the navigational receiver 12a is mounted on the carriage 14 including the inspection sensor (probe) that perform an inspection for defects of a metal plate. The navigational receiver 12a receives the rotating fan beams emitted from the navigational transmitters 11a of the position measurement system 200a as IGPS signals and determines its position. According to the second embodiment, the navigational transmitter 12b is mounted on the carriage 14 including the inspection sensor (probe) that perform an inspection for defects of a metal plate. The navigational transmitter 12b projects a laser beam in 360 degrees by using the laser triangulation technology and receives light reflected by the reflectors 11b so as to determine its position. As a result, the position and the angle of the carriage 14 on the metal plate can be determined with high accuracy without using a marking on the metal plate or a mark for image processing. In addition, deviation of the self-position determined in this manner from a target position is calculated, and the wheels are instructed, in accordance with the deviation, to rotate in the forward direction, rotate in the reverse direction, or stop so as to cause the carriage 14 to autonomously travel to a predetermined target position, and thus, the outer periphery of the metal plate can also be inspected. Furthermore, straightness with respect to the target traveling route can be ensured.

In addition, in both the embodiments, a scanning pattern of the probe that comes in proximity to a metal plate and performs a scanning operation and an inspection position and an inspection path corresponding to a predetermined pattern are set on the basis of information regarding the position and the attitude of the metal plate to be measured beforehand. A target position of the actuator that sets the position of the probe with respect to the carriage and a target position of the carriage can be set so as to achieve the scanning path, and thus, various scanning patterns can be employed. In particular, the position of the carriage can be controlled in such a manner that the deviation between the target position and the current position based on the navigational receiver is less than an allowable amount in flaw detection. Thus, high accuracy can be obtained with any scanning pattern.

The carriage 14 that travels on a surface of a metal plate may include four wheels so as to rotatable in the forward direction and the reverse direction, and the driving units 50 may each be provided for one of the wheels. The carriage 14 may include drive motors each of which drives one of the wheels so that the wheel rotates. In addition, the carriage 14 may include turning motors each of which is perpendicular to a surface of a metal plate on which the carriage 14 travels and each of which can turn the corresponding wheel 90 degrees or more about an axis that is offset toward the center of the carriage with respect to the wheel. With the above configuration, the carriage 14 can perform an oblique movement and a side-to-side movement in addition to a general back-and-forth movement while the attitude of the front side of the carriage is maintained. The carriage 14 can further perform a pivot turn at the place. Furthermore, fine adjustment of the position of the carriage 14 can be performed for various disturbances that cause deviation of the current position with respect to the target position, and the straightness to a target travel path can be increased to an extremely high degree.

Since the carriage 14 that travels on a surface of a metal plate includes the edge detection sensors that detect edges of the metal plate, which is an inspection target, the carriage 14 can be prevented from running off and falling from the metal plate and can perform an inspection along the edges of the metal plate when inspecting the edges of the metal plate.

There are advantages in that flaw detection can be automatically performed for scratches formed on a surface of a metal plate or internal defects of the metal plate in accordance with the inspection standards for metal plate products and that it is not necessary for an inspector to operate the flaw detection heads so as to search for scratches formed on a surface of a metal plate. Thereby, the inspector can be free from a falling accident on a metal plate on which water has been sprayed.

Note that this disclosure is not intended to be limited to the above-described embodiments, and various modifications can be made. For example, in the above-described embodiments, although the case has been described in which the carriage 14 includes the four wheels, the number of wheels is not limited to four and may be two or more. One or more navigational receivers 12a may be included in the position measurement system 200a to which the autonomous metal-plate inspection apparatus 300a according to the first embodiment is applied. One or more reflectors 11b may be included in the position measurement system 200b to which the autonomous metal-plate inspection apparatus 300b according to the second embodiment is applied.

A method for manufacturing a metal plate by using the autonomous metal-plate inspection apparatus of the disclosed embodiments will now be described. The method for manufacturing a metal plate of the disclosed embodiments includes a manufacturing step of manufacturing metal plates, an inspection step of inspecting the metal plates for defects that are present in the metal plates by using the autonomous metal-plate inspection apparatus of the disclosed embodiments, and a screening step of screening the metal plates on the basis of inspection results obtained in the inspection step.

Examples of the metal plate include steel plates, aluminum plates, and copper plates. In the manufacturing step of manufacturing the metal plates, a commonly known method for manufacturing these metal plates can be used.

In addition, in the method for manufacturing a metal plate of the disclosed embodiments, inspection is performed for defects that are present in metal plates by using the autonomous metal-plate inspection apparatus of the disclosed embodiments, and the metal plates are screened on the basis of inspection results. More specifically, for example, judgment criteria for the sizes of defects and the number of defects are established beforehand in accordance with the types and the applications of metal plates, and metal plates that meet the judgment criteria are selected on the basis of the inspection results obtained in the inspection step.

The above-described embodiments are examples in all respects, and the disclosure is not to be considered limited to these specific embodiments. It will be understood that various modifications are intended to be within the scope of the disclosed embodiments.

The invention claimed is:

1. An autonomous metal-plate inspection apparatus for inspecting a metal plate by using a position measurement system that measures a position based on a principle of triangulation, the autonomous metal-plate inspection apparatus comprising:
   a carriage that travels on a surface of a metal plate;
   a navigational transmitter mounted on the carriage for transmitting position-measurement-system signals or a navigational receiver mounted on the carriage for receiving position-measurement-system signals;
   an inspection unit mounted on the carriage, the inspection unit including a flaw detection head and an inspection-result generator configured to generate an inspection result, the flaw detection head including an inspection sensor for scanning an inspection region of the metal plate;
   a controller configured to execute, based on a position of the carriage measured by the position measurement system and a target position of the carriage for performing inspection, control of the carriage to autonomously travel to the target position and control of a scanning actuator that scans the flaw detection head; and
   an output unit configured to output a pulse signal to the inspection unit, the pulse signal corresponding to an amount of change in a position of the flaw detection head, which is updated in each control period, and the pulse signal being used as a position information of the flaw detection head,
   wherein:
   (i) the inspection-result generator generates the inspection result based on inspection information obtained by the inspection sensor and the position information of the flaw detection head,
   (ii) an output frequency of the pulse signal is set to synchronize with a product of an acquiring frequency of flaw detection data set by the inspection unit, a pulse resolution, and a display resolution of the inspection result, and
   (iii) a mechanical scanning speed of the flaw detection head is equal to or lower than an upper speed limit that is calculated by multiplying the display resolution of the inspection result and the acquiring frequency of the flaw detection data.

2. The autonomous metal-plate inspection apparatus according to claim 1, wherein the controller is further configured to execute, based on the position and an orientation of the carriage that are measured by the position measurement system and the target position and orientation of the carriage for performing inspection, control of the carriage to autonomously travel to the target position and orientation.

3. The autonomous metal-plate inspection apparatus according to claim 1, wherein the inspection sensor is a phased array probe in which a plurality of ultrasonic transducers are arranged.

4. The autonomous metal-plate inspection apparatus according to claim 1, wherein the position measurement system is an indoor global position system (IGPS), and
   the navigational receiver receives rotating fan beams emitted from one or more navigational transmitters of the IGPS and recognizes the rotating fan beams to be IGPS signals that are the position-measurement-system signals.

5. The autonomous metal-plate inspection apparatus according to claim 1, wherein the position measurement system employs a laser triangulation technology, and
   the navigational transmitter is configured to have a function of projecting and receiving laser beams and performs laser triangulation, and the navigational transmitter causes laser beams projected by the navigational transmitter to be reflected by one or more reflectors and receives reflected light as the position-measurement-system signals.

6. The autonomous metal-plate inspection apparatus according to claim 1, wherein the carriage includes at least two rotatable wheels and driving units that drive the wheels, and each of the driving units is provided for a corresponding one of the wheels and includes a first driving system that drives the corresponding wheel to rotate and a second driving system that is capable of driving the wheel to turn 90 degrees or more about an axis that is perpendicular to a surface of a metal plate on which the carriage travels and that offset toward the center of the carriage with respect to the wheel.

7. The autonomous metal-plate inspection apparatus according to claim 1, further comprising an edge detection sensor included in the carriage, the edge detection sensor detecting an edge of a metal plate to be inspected.

8. A method for manufacturing a metal plate comprising:
manufacturing metal plates;
inspecting the metal plates for defects that are present in the metal plates by using the autonomous metal-plate inspection apparatus according to claim 1; and
screening the metal plates based on inspection results obtained in the inspecting step.

9. The autonomous metal-plate inspection apparatus according to claim 3, wherein the position measurement system is an indoor global position system (IGPS), and
the navigational receiver receives rotating fan beams emitted from one or more navigational transmitters of the IGPS and recognizes the rotating fan beams to be IGPS signals that are the position-measurement-system signals.

10. The autonomous metal-plate inspection apparatus according to claim 3, wherein the position measurement system employs a laser triangulation technology, and
the navigational transmitter is configured to have a function of projecting and receiving laser beams and performs laser triangulation, and the navigational transmitter causes laser beams projected by the navigational transmitter to be reflected by one or more reflectors and receives reflected light as the position-measurement-system signals.

11. A method for manufacturing a metal plate comprising:
manufacturing metal plates;
inspecting the metal plates for defects that are present in the metal plates by using the autonomous metal-plate inspection apparatus according to claim 3; and
screening the metal plates based on inspection results obtained in the inspecting step.

12. An autonomous metal-plate inspection method for inspecting a metal plate by using a position measurement system for measuring a position on a basis of a principle of triangulation, the method comprising:
generating an inspection result by using an autonomous metal-plate inspection apparatus including (i) a carriage that travels on a surface of a metal plate, (ii) a navigational transmitter mounted on the carriage for transmitting position-measurement-system signals or a navigational receiver mounted on the carriage for receiving position-measurement-system signals, (iii) an inspection unit mounted on the carriage, the inspection unit including a flaw detection head and an inspection-result generator configured to generate the inspection result, the flaw detection head including an inspection sensor for scanning an inspection region of the metal plate, (iv) a controller configured to execute, based on a position of the carriage measured by the position measurement system and a target position of the carriage for performing inspection, control of the carriage to autonomously travel to the target position and control of a scanning actuator to scan the flaw detection head, and (v) an output unit configured to output a pulse signal to the inspection unit, the pulse signal corresponding to an amount of change in a position of the flaw detection head, which is updated in each control period, and the pulse signal being used as a position information of the flaw detection head, wherein:
(i) the inspection-result generator generates the inspection result based on inspection information obtained by the inspection sensor and the position information of the flaw detection head,
(ii) an output frequency of the pulse signal is set to synchronize with a product of an acquiring frequency of flaw detection data set by the inspection unit, a pulse resolution, and a display resolution of the inspection result, and
(iii) a mechanical scanning speed of the flaw detection head is equal to or lower than an upper speed limit that is calculated by multiplying the display resolution of the inspection result and the acquiring frequency of flaw detection data.

13. The autonomous metal-plate inspection method according to claim 12, wherein the controller is further configured to execute, based on a position and an orientation of the carriage that are measured by the position measurement system and a target position and orientation of the carriage for performing inspection, control of the carriage to autonomously travel to the target position and orientation.

* * * * *